(12) United States Patent
Pate

(10) Patent No.: US 11,650,148 B2
(45) Date of Patent: May 16, 2023

(54) CAVITY-ENHANCED FOURIER TRANSFORM SPECTROSCOPY FOR CHIRAL ANALYSIS

(71) Applicant: University of Virginia Patent Foundation, Charlottesville, VA (US)

(72) Inventor: Brooks Hart Pate, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 17/647,364

(22) Filed: Jan. 7, 2022

(65) Prior Publication Data

US 2022/0268699 A1    Aug. 25, 2022

Related U.S. Application Data

(63) Continuation of application No. 16/344,688, filed as application No. PCT/US2017/058250 on Oct. 25, 2017, now Pat. No. 11,237,104.

(Continued)

(51) Int. Cl.
*G01N 21/3586* (2014.01)
*G01N 22/00* (2006.01)
(Continued)

(52) U.S. Cl.
CPC ............ *G01N 21/3586* (2013.01); *G01J 1/16* (2013.01); *G01J 3/30* (2013.01); *G01J 3/447* (2013.01);
(Continued)

(58) Field of Classification Search
None
See application file for complete search history.

(56) References Cited

U.S. PATENT DOCUMENTS

| | | | |
|---|---|---|---|
| 4,369,404 A | 1/1983 | Flygare et al. | |
| 4,703,273 A | 10/1987 | Kolbe et al. | |
| 5,124,653 A | 6/1992 | Andresen et al. | |
| 5,793,485 A | 8/1998 | Gourley | |
| 5,831,439 A | 11/1998 | Suenram et al. | |

(Continued)

FOREIGN PATENT DOCUMENTS

| | | |
|---|---|---|
| CN | 102124332 A | 7/2011 |
| CN | 110050174 A | 7/2019 |

(Continued)

OTHER PUBLICATIONS

"U.S. Appl. No. 16/344,688, Advisory Action dated Aug. 20, 2021", 3 pgs.
"U.S. Appl. No. 16/344,688, Examiner Interview Summary dated Jun. 11, 2021", 2 pgs.

(Continued)

*Primary Examiner* — Edwin C Gunberg
(74) *Attorney, Agent, or Firm* — Schwegman Lundberg & Woessner, P.A.

(57) ABSTRACT

A chiral molecule can be defined as a molecule that has a non-superimposable mirror image. These mirror images can be referred to as enantiomers. The enantiomers generally have the same set of bond lengths and bond angles in their three-dimensional geometry. Apparatus and techniques described herein can be used to perform analysis of chiral molecules using cavity-enhanced molecular rotational spectroscopy. A sample cell can define a resonant cavity, and a sample introduction port can provide pulse-jet injection of an analyte molecule and a chiral tag to allow analysis of a complex comprising the analyte and chiral tag.

20 Claims, 16 Drawing Sheets

Related U.S. Application Data

(60) Provisional application No. 62/413,155, filed on Oct. 26, 2016.

(51) Int. Cl.
    *H01J 23/207*     (2006.01)
    *G01J 1/16*     (2006.01)
    *G01J 3/30*     (2006.01)
    *H01J 23/20*     (2006.01)
    *G01J 3/447*     (2006.01)

(52) U.S. Cl.
    CPC .............. *G01N 22/00* (2013.01); *H01J 23/20* (2013.01); *H01J 23/207* (2013.01)

(56) References Cited

U.S. PATENT DOCUMENTS

| | | |
|---|---|---|
| 7,768,647 B2 | 8/2010 | Reeve et al. |
| 8,748,822 B1 | 6/2014 | Gerecht et al. |
| 8,941,828 B2 | 1/2015 | Loock et al. |
| 9,329,123 B2 | 5/2016 | Harb |
| 9,857,315 B2 | 1/2018 | Patterson et al. |
| 9,891,165 B2 | 2/2018 | Pate et al. |
| 11,237,104 B2 | 2/2022 | Pate |
| 2005/0192767 A1 | 9/2005 | Busch et al. |
| 2006/0063188 A1 | 3/2006 | Zanni et al. |
| 2008/0274555 A1 | 11/2008 | Kibar et al. |
| 2009/0224147 A1 | 9/2009 | Mie et al. |
| 2010/0045969 A1* | 2/2010 | Busch ................... G01N 21/65 324/309 |
| 2010/0105099 A1 | 4/2010 | Dmochowski et al. |
| 2013/0154611 A1 | 6/2013 | Pate et al. |
| 2013/0265573 A1 | 10/2013 | Pate et al. |
| 2014/0110599 A1 | 4/2014 | Lehmann |
| 2014/0377792 A1 | 12/2014 | Dasgupta et al. |
| 2015/0177164 A1 | 6/2015 | Patterson et al. |
| 2015/0253261 A1 | 9/2015 | Pate et al. |
| 2015/0260575 A1 | 9/2015 | Pate et al. |
| 2015/0364304 A1 | 12/2015 | Nikolaev |
| 2016/0131600 A1 | 5/2016 | Pate et al. |
| 2019/0302015 A1 | 10/2019 | Pate |

FOREIGN PATENT DOCUMENTS

| | | |
|---|---|---|
| CN | 110050174 B | 10/2021 |
| JP | 2015529804 A | 10/2015 |
| JP | 2019533814 A | 11/2019 |
| WO | WO-2011160013 A1 | 12/2011 |
| WO | WO-2012129089 A1 | 9/2012 |
| WO | WO-2012135044 A1 | 10/2012 |
| WO | WO-2014189995 A2 | 11/2014 |
| WO | WO-2014201230 A1 | 12/2014 |
| WO | WO-2015195641 A2 | 12/2015 |
| WO | WO-2018081243 A1 | 5/2018 |

OTHER PUBLICATIONS

"U.S. Appl. No. 16/344,688, Final Office Action dated Apr. 1, 2021", 9 pgs.
"U.S. Appl. No. 16/344,688, Non Final Office Action dated Nov. 20, 2020", 9 pgs.
"U.S. Appl. No. 16/344,688, Notice of Allowance dated Sep. 28, 2021", 9 pgs.
"U.S. Appl. No. 16/344,688, Response filed Feb. 22, 2021 to Non Final Office Action dated Nov. 20, 2020", 10 pgs.
"U.S. Appl. No. 16/344,688, Response filed Jul. 22, 2021 to Final Office Action dated Apr. 1, 2021", 10 pgs.
"U.S. Appl. No. 16/344,688, Response filed Sep. 1, 2021 to Advisory Action dated Aug. 20, 2021", 11 pgs.
"U.S. Appl. No. 16/344,688, Supplemental Preliminary Amendment filed Jun. 3, 2020", 7 pgs.
"Chinese Application Serial No. 201780065948.7, Office Action dated Feb. 2, 2021", w/ English translation, 22 pgs.
"European Application Serial No. 17864360.7, Extended European Search Report dated Jul. 3, 2020", 16 pgs.
"European Application Serial No. 17864360.7, Response filed Dec. 112, 2019 to Communication pursuant to Rules 161 (2) and 162 EPC dated Jun. 6, 2019", 15 pgs.
"European Application Serial No. 17864360.7, Response filled Jan. 29, 2021 to Extended European Search Report dated Jul. 3, 2020", 17 pgs.
"International Application Serial No. PCT/US2017/058250, International Preliminary Report on Patentability dated May 9, 2019", 7 pgs.
"International Application Serial No. PCT/US2017/058250, International Search Report dated Jan. 17, 2018", 2 pgs.
"International Application Serial No. PCT/US2017/058250, Written Opinion dated Jan. 17, 2018", 5 pgs.
"Japanese Application Serial No. 2019-522239, Notification of Reasons for Refusal dated Sep. 7, 2021", w/ English translation, 13 pgs.
"Japanese Application Serial No. 2019-522239, Response filed Jan. 5, 2022 to Notification of Reasons for Refusal dated Sep. 7, 2021", w/ English claims, 18 pgs.
Alvin, Shubert V, et al., "Enantiomer-sensitive spectroscopy and mixture analysis of chiral molecules containing two stereogenic centers—Microwave three-wave mixing of ment", Journal of Molecular Spectroscopy, 300, (Apr. 18, 2014), 31-36.
Balle, T.J, et al., "Fabry-Perot cavity pulsed Fourier transform microwave spectrometer with a pulsed nozzle particle source", Rev. Sci. Instrum. 52, 33-45, (1981), 14 pgs.
Brown, Gordon G., et al., "A broadband Fourier transform microwave spectrometer based on chirped pulse excitation", Rev Sci Instrum., 79(5), American Institute of Physics; 053103-1-053103-13, (May 2008), 14 pgs.
Grabow, Jens-Uwe, "Fourier Transform Microwave Spectroscopy: Handedness Caught by Rotational Coherence", Angew. Chem. Int. Ed. 52, 11698-11700, (2013), 3 pgs.
He, Yanan, et al., "Determination of absolute configuration of chiral molecules using vibrational optical activity", Applied Spectroscopy 7, vol. 65, 699-723, (2011), 25 pgs.
Hooft, Rob W. W., et al., "Determination of absolute structure using Bayesian statistics on Bijovet differences", J. Appl. Cryst. 41, 96-103, (2008), 8 pgs.
King, Adrian K, et al., "A High-Resolution Microwave Study of the Butan-2-ol Argon Complex", Journal of Molecular Spectroscopy, 214(2), (2002), 97-102.
King, Adrian K., et al., "A microwave study of the heterochiral dimer of butan-2-ol", Chem. Phys. Lett. 348, 343-349, (2001), 7 pgs.
Lobsiger, Simon, et al., "Molecular Structure and Chirality Detection by Fourier Transform Microwave Spectroscopy", J. Phys. Chem. Lett. 6, 196-200, (2015), 5 pgs.
Maris, Assimo, et al., "Molecular recognition of chiral conformers: a rotational study of the dimers of glycidol", J. Am. Chem. Soc. 130, 13860-13861, (2008), 2 pgs.
Parchansky, Vaclav, et al., "Inspecting chiral molecules by Raman optical activity spectroscopy", RSC Adv. 2014, 4, 57125-57136, (2014), 12 pgs.
Parsons, Simon, et al., "Use of intensity quotients and differences in absolute structure refinement", Acta Crystallographia B69, 249-259, (2013), 11 pgs.
Pate, Brooks H., et al., "Chapter 17: Quantitative Chiral Analysis by Molecular Rotational Spectroscopy", in Chiral Analysis 2nd Edition Advances in Spectroscopy, Chromatography, and Emerging Methods, P.L. Polavarapu, Editor, Elsevier Science, (2018), 50 pgs.
Patterson, David, et al., "Enantiomer-specific detection of chiral molecules via microwave spectroscopy", Nature 497, 475, (2013), 4 pgs.
Patterson, David, et al., "New Studies on Molecular Chirality in the Gas Phase: Enantiomer Differentiation and Determination of Enantiomeric Excess", Phys. Chem. Chem. Phys. 16, 11114-11123, (2014), 10 pgs.

(56) References Cited

OTHER PUBLICATIONS

Patterson, David, et al., "Sensitive Chiral Analysis vis Microwave Three-Wave Mixing", Phys. Rev. Lett. 111, 023008, (2013), 5 pgs.

Péréz, Cristóbal, et al., "Broadband Fourier Transform Rotational Spectroscopy for Structure Determination: The Water Heptamer (Frontiers Article)", Chem. Phys. Lett. 571, 1-15, (2013), 15 pgs.

Robert, Cameron P, et al., "Chiral Rotational Spectroscopy", arXiv:1511.04615v4 [physics.atm-clus], (Jan. 13, 2018), 26 pgs.

Robert, Cameron P, et al., "Chiral rotational spectroscopy", Physical Review A, 94 032505, (2016), 24 pgs.

Shubert, V. Alvin, et al., "Chiral analysis using broadband rotational spectroscopy", J. Phys. Chem. Lett. 7, 341-350, (2016), 10 pgs.

Shubert, V. Alvin, et al., "Identifying Enantiomers in Mixtures of Chiral Molecules with Broadband Microwave Spectroscopy", Angew. Chem. Int. Ed. 53, 1152-1155, (2014), 4 pgs.

Su, Zheng, "Chiral Self-recognition: Direct spectroscopic detection of homochiral and heterochiral dimers of propylene oxide in the gas phase", J. Am. Chem. Soc. 128, 17126-17131, (2006), 6 pgs.

Thomas, Javix, et al., "Chirality recognition in the glycidol-propylene oxide complex: a rotational spectroscopic study", Chem. Eur. J. 17, 4582-4587, (2011), 6 pgs.

Yan, et al., "Unique Contrast Patterns from Resonance Enhanced Chiral SHG of Cell Membranes", Journal of the American Chemical Society vol. 128, Issue 34, [Online]. Retrieved from the Internet: <https://www.ncbi.nlm.nih.gov/pmc/articles/PMC2505333>, (Aug. 30, 2006), 11030-11031.

Zehnacker, Anne, et al., "Chirality Recognition between Neutral Molecules in the Gas Phase", Angewandte Chemie International Edition vol. 47, Issue 37, pp. 6970-6992, (2008), 25 pgs.

U.S. Appl. No. 16/344,688, U.S. Pat. No. 11,237,104, filed Apr. 24, 2019, Cavity-Enhanced Fourier Transform Spectroscopy for Chiral Analysis.

* cited by examiner

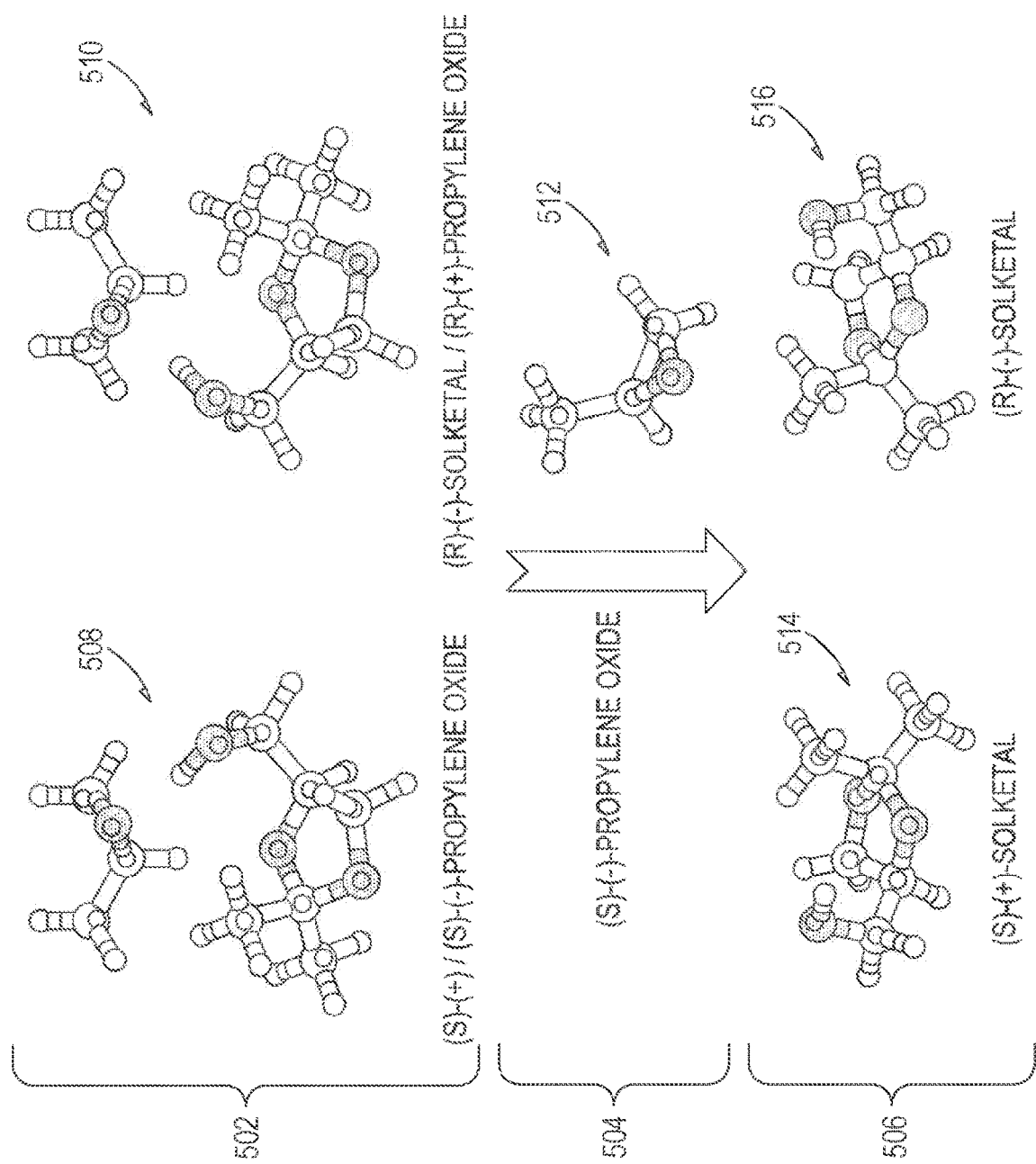

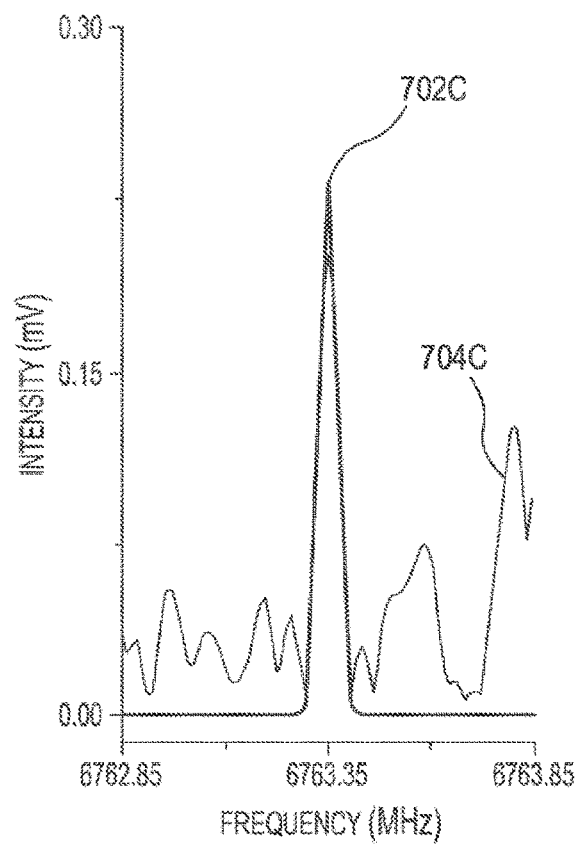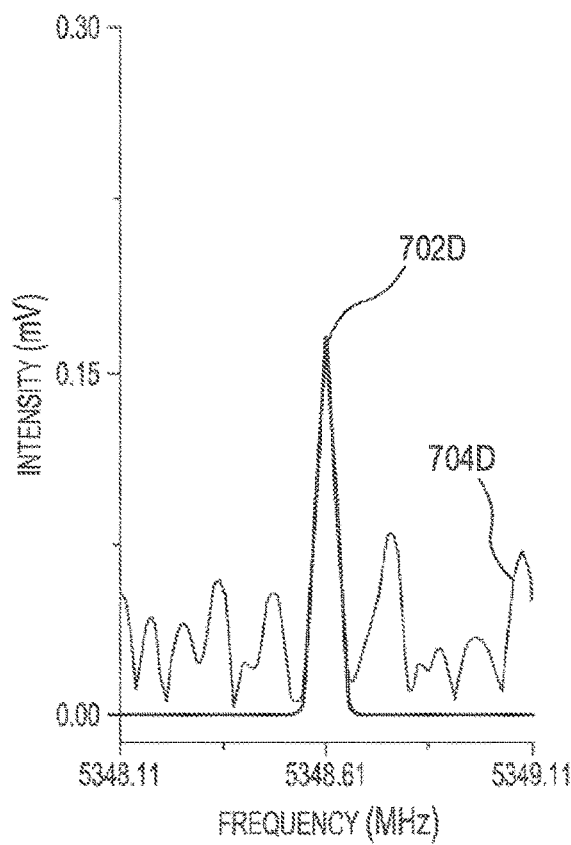
*FIG. 7C*  *FIG. 7D*

CAVITY-ENHANCED FOURIER TRANSFORM SPECTROSCOPY FOR CHIRAL ANALYSIS

CLAIM OF PRIORITY

This patent application is a continuation of U.S. patent application Ser. No. 16/344,688, filed on Apr. 24, 2019, which is a U.S. National Stage Filing under 35 U.S.C. 371 from International Application No. PCT/US2017/058250, filed on Oct. 25, 2017, and published as WO 2018/081243, which claims the benefit of priority of Pate, U.S. Provisional patent application Ser. No. 62/413,155 titled "System and Method for Multiplexed Cavity-Enhanced Fourier Transform Microwave Spectrometer for Chiral Analysis," filed on Oct. 26, 2016, which are hereby incorporated by reference herein in their entireties.

STATEMENT REGARDING FEDERALLY SPONSORED RESEARCH OR DEVELOPMENT

This invention was made with government support under CHE1531913 awarded by the National Science Foundation. The government has certain rights in the invention.

FIELD OF THE DISCLOSURE

This document pertains generally, but not by way of limitation, to molecular rotational spectroscopy, and more particularly to cavity-enhanced Fourier-Transform molecular rotational spectroscopy.

BACKGROUND

A chiral molecule can be defined as a molecule that has a non-superimposable mirror image. These mirror images can be referred to as enantiomers. The enantiomers generally have the same set of bond lengths and bond angles in their three-dimensional geometry. As a result, enantiomers have similar molecular properties, including their traditional absorption spectra. Because living systems are composed of chiral molecules with a specific handedness, they are "asymmetric" systems and the biochemistry of enantiomers can differ. As a result, the ability to analyze the stereochemical structures of chiral molecules finds many applications in the field of chemistry, particularly for applications in pharmaceuticals.

A chiral molecule can have a structure where there are several "chiral centers" such as "asymmetric carbon atoms" that have four different chemical substituents. In this illustration, a local stereochemistry of each asymmetric carbon can either be right handed or left handed—such as indicated using the Cahn-Ingold-Prelog R/S notation. As a result, for a molecule with N chiral centers, there are $2^N$ stereoisomers. In the general case (where there is no possibility for meso structures), the stereoisomers will have $2^{N-1}$ distinct molecular geometries, which can be referred to as diastereomers, and for each diastereomer there are the two non-superimposable mirror images that can be referred to as enantiomers. The enantiomers have opposite local chirality at each chiral center. For example, in a molecule with three chiral centers the diastereomer formed with all three chiral centers in the R configuration (RRR) has an enantiomer with all three in the S configuration (SSS).

Generally-available analytical chemistry instruments for chiral analysis fall into two broad categories: chromatography and light-based analysis. Chromatography takes a sample mixture and separates it though differential interactions of the molecule and a stationary phase that occur as the sample flows through a "column." Implementations include gas chromatography (GC), high-performance liquid chromatography (HPLC), and many other variants. Modern chromatography can achieve separations of complex mixtures of distinct geometries, such as diastereomer, using small amounts of sample. If the stationary phase is itself chiral, then it is possible to achieve separation of the enantiomers. For chiral analysis, two different measurements are often used to determine the diastereomer and enantiomer compositions. Significant development time may be required to find instrument protocols that produce clear separation of all components of interest Reference samples can be required to determine the identity of the compound at each elution time, especially for enantiomer separations. Therefore, other chiral analysis techniques are generally used to calibrate the chromatography instrument.

There are a diverse set of measurements that can use light to determine the molecular structure and an absolute configuration of a chiral molecule. Such analysis approaches include diffraction of light, rotation of polarized light (polarimetry), and differential absorption of left and right circularly polarized light (circular dichroism) and its related Raman version (Raman optical activity), and methodologies to gain chiral information from intrinsically achiral spectroscopy (an approach used for nuclear magnetic resonance (NMR) analysis).

X-ray diffraction is used for determining an absolute configuration (handedness) of the molecule. It generally involves use of an enantiopure sample in the form of a single crystal. This sample preparation requirement can limit its usefulness One way to determine the absolute configuration is the use of an internal chiral reference. This reference can include a molecule with known (e.g., previously determined) absolute configuration. If this molecule can be co-crystallized with the molecule of interest, then the unit cell structure is for the complex. Although both enantiomers of the complex would produce the same diffraction pattern, knowledge of the absolute configuration of the internal reference molecule makes it possible to unambiguously assign the absolute configuration of the molecule it has paired with.

Another technique to determine absolute configuration is to use an intensity variation of the diffraction peaks of a single crystal sample that are caused by anomalous absorption. This approach can lead to inconclusive results for molecules with only light atoms (e.g., C, N, O, or H). Use of X-ray diffraction can pose various challenges, such as that the initial sample generally includes a known (and high) enantiopurity at the start to insure a single, enantiopure crystal is formed for analysis.

Polarimetry is another technique for chiral analysis, and can be used to observe the rotation of polarized light by an optically active sample using a polarimeter. The direction of rotation is often used to designate the handedness of the enantiomers using the (+)/(−) designation referring to the direction of plane polarized light rotation. Polarimetry has essentially no chemical selectivity and the analysis generally involves use of pure samples, possibly dissolved in a solvent. This makes polarimetry useful for rapid verification of enantiopurity, however, such a technique has limited value for chemical analysis.

Circular dichroism (CD) can be used to determine a differential absorption of left and right circularly polarized light. Each enantiomer shows an opposite preference so that an equal, or racemic, mixture of the (+) and (−) enantiomers produces no differential absorption. If the overall sample is optically active due to an excess of one enantiomer over the other, then a CD signal can be obtained. The origin of the signal is the interference in the absorption caused by the electric and magnetic dipole moments of the molecule. Because the magnetic dipole moment is much smaller, the differential CD absorption signal is generally weak compared to other spectroscopy techniques. For vibrational circular dichroism (VCD) the chiroptical signal is on the order of $10^{-4}$ of the regular vibrational spectrum intensity. The CD signal strength has a strong dependence on the frequency of the light used to probe the sample. As a result, rotational CD effects are expected to be well below measurable levels. Applications of CD include vibrational spectroscopy in the infrared region of the electromagnetic spectrum and electronic spectroscopy in the visible and UV region Similar signal intensity scaling generally occurs for Raman optical activity variants.

Vibrational CD and electronic CD can be used in chiral analysis. The vibrational spectrum of the molecule can be used as a discriminating signature of the molecular geometry. Therefore, VCD offers good chemical selectivity, compared to electronic spectroscopy based methods that have limited spectral resolution. Similarly, Raman optical activity for vibrational spectroscopy offers chemical selectivity. VCD can present challenges, such as that the obtained spectra are congested for most measurements and such congestion can make it difficult to perform analysis on mixtures. VCD studies generally use purified molecular samples. High sample concentrations are generally used, such as due to the weakness of the signal, and this can lead to the formation of molecular complexes that complicate the spectrum analysis. For enantiomeric excess ("ee") measurements, a signal amplitude (e.g., a differential absorption signal) is generally calibrated with a sample of known enantiopurity. Prediction of the VCD spectrum can be a computationally hard problem, such as involving generation of theoretical VCD spectra of all possible molecular conformations present in the sample, and the sample is usually at room-temperature.

SUMMARY OF THE DISCLOSURE

The present inventor has recognized, that there are specific instruments designed for chiral analysis, such as mentioned above. The present inventor has also recognized, among other things, that no one of the techniques mentioned above provides broad generality and routine measurement implementation. Quantitative analysis of the isomers of a chiral molecule is generally challenging, particularly for molecules with multiple chiral centers. A full chiral analysis for a molecule with multiple chiral centers could provide one or more of a relative abundance of the diastereomers which have distinct molecular geometries, a ratio of the enantiomers for each of these diastereomers (given as the enantiomeric excess ("ee"), for example), or an absolute configuration for an enantiomer in highest abundance.

For applications including pharmaceuticals, it can be desired that the diastereomer and enantiomer purity is measured at 99.5% or higher. The present inventor has recognized, among other things, that a challenge exists to perform such analysis without requiring reference samples of the diastereomers and their enantiomers. The present subject matter described in this application can provide an instrument (and related techniques) that use rotational spectroscopy for chemical detection. Such an instrument can perform chiral analysis measurements with a general measurement process. Such techniques can provide one or more of measurements to support (1) determination of an enantiomeric excess, (2) relative abundance of diastereomers, or (3) an absolute configuration of an enantiomer.

An aspect of an embodiment provides, among other things, an instrument (and related method) for a spectrometer. An aspect of an embodiment provides, among other things, a system and method using a cavity-enhanced Fourier transform spectrometer apparatus. An aspect of an embodiment provides, among other things, a system and techniques for a rotational spectroscopy instrument that can perform chiral analysis such as for determination of one or more of an absolute configuration or enantiomeric excess measurement (e.g., including determinations approaching a high enantiopurity limit) An aspect of an embodiment may include an instrument that provides spectrum acquisition such for broadband measurements or for measuring signals at specific, known transition frequencies, and a corresponding sample introduction system for performing chiral tagging measurements for one or more of absolute configuration and enantiomeric excess determination. An aspect of an embodiment provides, among other things, a system and method using multiplexed cavity-enhanced Fourier transform spectroscopy for chiral analysis of molecules using chiral tagging molecular rotational spectroscopy.

In an example, a technique such as a method can include, injecting an analyte and a chiral tag into a sample cell comprising a resonant cavity using a pulsed jet, electrically exciting multiple modes of the resonant cavity, electrically obtaining a time-domain response from a sample comprising the analyte and the chiral tag, the response elicited by the electrically exciting the resonant cavity, and determining a frequency-domain representation of the time-domain response.

In an example, a technique, such as a method, can include electrically obtaining a first response elicited from a resonant cavity housing a first sample including an analyte and a racemic mixture comprising a chiral tag, electrically obtaining a second response elicited from the resonant cavity housing a second sample including the analyte and a specified-enantiopurity form of the chiral tag, where the first and second responses are elicited by electrically exciting multiple modes of the resonant cavity, the modes corresponding to a range of molecular rotational resonances to be interrogated.

In an example, an apparatus or system, such as a spectrometer apparatus, can include a sample cell including a resonant cavity, a source electrically coupled to the sample cell to electrically excite multiple modes of the resonant cavity, a receiver electrically coupled to the sample cell to obtain a response elicited from a sample within the sample cell, in response to excitation of the resonant cavity using the source, the receiver comprising an analog-to-digital converter to provide a digital representation of a time-domain response obtained from the sample cell, and an isolator to isolate the source from the sample cell at least when the receiver is receiving the response elicited from the sample, where the sample cell comprises at least two sample introduction ports, including at least one sample introduction port to receive an analyte and a chiral tag.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates generally an illustrative example of a technique, such as can include forming a complex of an analyte and a racemic mixture of a chiral tag, obtaining a corresponding frequency-domain rotation spectrum, and forming a complex of the analyte and an enantiopure form of the chiral tag, and obtaining another frequency-domain rotation spectrum, such as to distinguish between diastereomers within the analyte or to assist in determining an absolute configuration of the analyte.

FIG. 7A, FIG. 7B, FIG. 7C, and FIG. 7D illustrate generally illustrative examples of experimentally-obtained rotational transitions of a homochiral solketal-propylene oxide complex, along with measurements of a commercially-available sample of (S)-solketal and (R)-propylene oxide.

DETAILED DESCRIPTION

Figure 1:
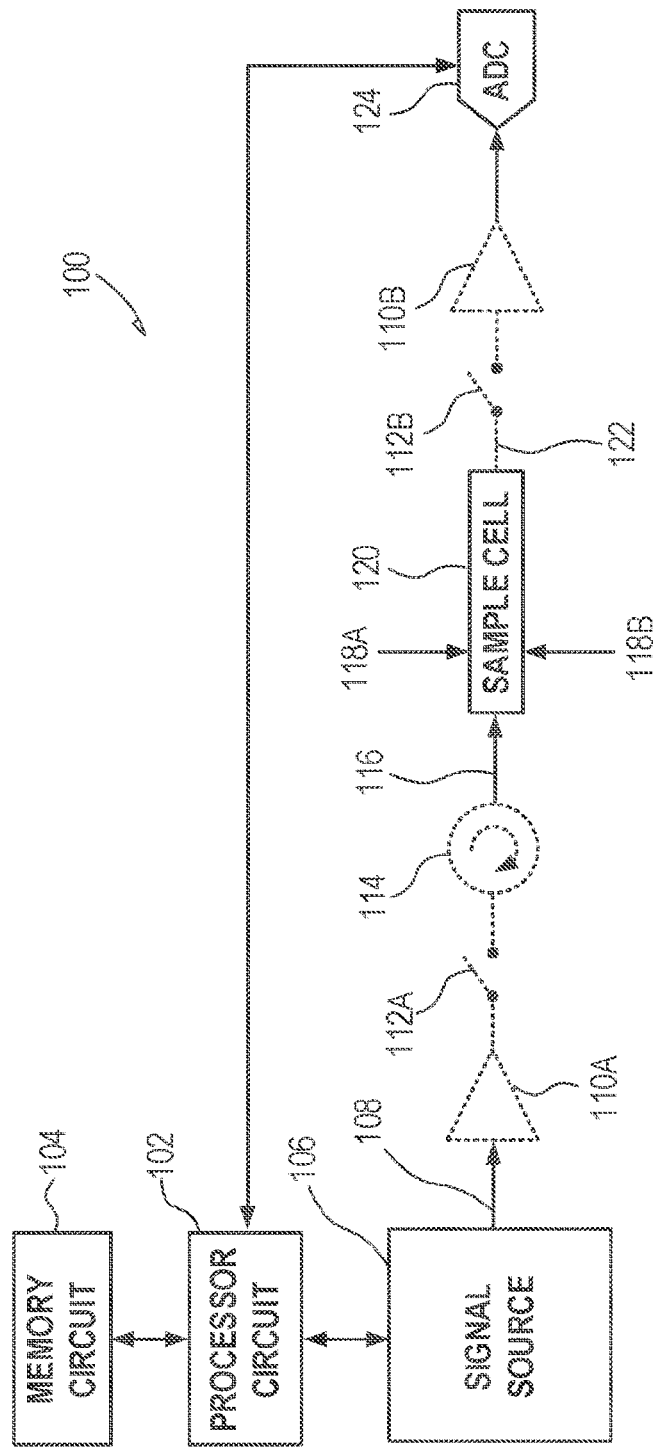
FIG. 1 illustrates generally an example of an apparatus, such as can be used for performing one or more techniques shown and described elsewhere herein.

Absorption spectroscopy (e.g., spin resonance (NMR/ESR), rotational, vibrational, and electronic) generally does not produce any difference in the obtained frequency-domain spectra of enantiomers and, therefore, such techniques are not generally applicable to chiral analysis. Measurement approaches can be used that convert the enantiomer mixtures into different diastereomers that can then be distinguished by the spectroscopy. To illustrate, for a molecule with three chiral centers, one of the diastereomers can be denoted [RRR] using the Cahn-Ingold-Prelog notation for each of the three chiral centers. A challenging analysis problem is to determine the relative populations of the two enantiomers of this diastereomer in an unknown sample. These enantiomers are [RRR] and [SSS]. It is desirable to have a technique that can detect trace amounts of one enantiomer in the presence of the other. Validating enantiopurity at higher than 99.5% is useful in certain applications. As mentioned previously, chromatography can be used because enantiomer separation on the chiral column makes it possible to detect the enantiomers in different detection channels so that trace detection is possible. However, such an approach can present challenges because a protocol must generally be developed to provide full separation of eluting peaks.

Enantiomer-to-diastereomer conversion has the potential to create a "separate detection channel" condition. Such a technique can involve creating a new molecule with a fourth (or more) chiral center using a chemical reagent of high enantiopurity and known absolute configuration. For example, if this reagent has a chiral center that is known to be (S)-configuration, then the enantiomers are converted to diastereomers that are [RRR]-(S) and [SSS]-(S). As an analytical chemistry technique, the [RRR]-(S) and [SSS]-(S) spectral features are then unambiguously assigned to determine the absolute configuration ([RRR] or [SSS]) of the molecule of interest. If the two diastereomer spectra produced lead to highly-resolved spectra, where there is little or no spectral overlap in the features of the [RRR]-(S) and [SSS]-(S) diastereomers that have been created, then enantiomeric excess measurements can be performed, with the potential to detect trace enantioimpurity.

Chiral analysis by NMR spectroscopy can provide high chemical selectivity and reasonably high-spectral resolution that opens the door to enantiomeric excess measurements in the high ee limit using resolved NMR resonances of the diastereomers. For both electronic spectroscopy and NMR spectroscopy this approach generally involves the development of specialized complexing reagents (e.g., chiral shift agents in NMR) or chiral derivatizing reagents (e.g., for cases where a chemical reaction is used to convert the enantiomers to diastereomers). There are examples of the development of molecule-specific, and usually chemically complex, "chiral resolving agents" for such NMR-based techniques. However, a challenge can exist with respect to such techniques, which generally involve enantiopure (e.g., significantly enantioenriched) resolving agents to make the final diastereomer identification. As a result, these approaches offer limited general applicability (e.g., compared to chromatography) and may involve use of expensive reagents to implement the protocol.

Molecular rotational spectroscopy, which can be referred to as molecular rotational resonance (MRR) spectroscopy, has strengths that can make it an appropriate technique for use in chiral analysis A chemical selectivity of rotational spectroscopy makes it possible to resolve small changes in the three-dimensional geometry of molecules and leads to resolution of the different diastereomer spectra. A spectral resolution of such rotational measurements allows diastereomer analysis without the need for chromatographic separation. The sensitivity of molecular rotation spectroscopy instrumentation, such as a Fourier transform microwave instrument, can routinely achieve 1000:1 dynamic ranges such as to support 99.9% diastereomer purity measurements. The close connection between calculated structures from quantum chemistry and spectroscopic constants from the spectrum analysis can provide high confidence determination of a diastereomer geometry without the need for a reference sample. Rotational spectroscopy also has a capability for identifying the positions of individual atoms in a molecular structure. The measurement can be used to compare rotational spectra of a base molecule with an isomer where a single atom (typically C, H, N, or O) is replaced by a less abundant, stable isotope—these distinct structures are called isotopologues. From the changes in the spectroscopic constants (e.g., referred to as the rotational constants and inversely related to the principal moments-of-inertia of the molecular geometry) it is possible to determine the distance of the isotopically-substituted atom from the center-of-mass and to gain information about its coordinates in the principal axis system (generally only magnitudes, not signs, of the coordinates are available).

In one approach, a three-wave mixing technique can be used. This technique is based on different physical principles than other techniques used in the field of chiral analysis (like VCD, mentioned above). The basic appearance of spectra obtained using rotational three-wave mixing has some similarity to circular dichroism. The enantiomers produce a signal of different sign so that a signal is only observed, for example, if there is an enantiomeric excess in the sample. A sign of the obtained signal contains information about the absolute configuration that can be interpreted by comparison to analytically-modeled predictions (e.g., involving an accurate calculation of a dipole moment vector of the molecules). An amplitude of the obtained signal can be proportional to an enantiomeric excess. The three-wave mixing technique can present challenges:

1) To perform enantiomeric excess measurements a sample of the molecule of interest with known ee is generally used to calibrate the signals. A competing technique, chromatography, does not have this limitation.

2) Even if a calibration sample having a known ee is available, it can still be difficult to work in the high enantiopurity limit. As an illustrative example, it can be a challenge to determine if the three wave mixing signal is 99.5% instead of 99.9% of the maximum value and such a difference is illustrative of the resolution called for in relation to various regulatory requirements.

3) Even if there were an instrument that provided accurate, calibrated three-wave mixing signals for absolute configuration determination, there would likely still be cases where the dipole moment is almost orthogonal to one of the principal axes and, in this example, theory might not have the accuracy to make an unambiguous interpretation of a measured phase.

The present inventor has, among other things, developed techniques and related apparatus to address the challenges mentioned above, using a different approach to performing molecular rotational spectroscopy. In one approach, a broadband Fourier transform spectrometer can be used along with a chiral-tagging technique. In an example, a cavity having multiple resonant modes can be used such as to provide "multiplexed" measurements of multiple frequencies using the same cavity and sample. Without being bound by theory, such techniques are believed applicable to a wide range of frequencies including at least one of a microwave frequency range, a millimeter-wave range, or a terahertz frequency range.

As an example, the present subject matter can include, among other things, an apparatus and related techniques for performing chiral analysis using rotational spectroscopy. Chiral analysis can be performed by converting enantiomers to diastereomers by affixing a "chiral tag." This chiral tag is generally small molecule available in racemic and enantioenriched (e.g., "enantiopure") samples. In an example, such enantioenrichment can include providing an ee of the chiral tag approaching 100%. The chiral tag can be "attached" to an analyte molecule through noncovalent chemical interactions by creating a molecular complex of the molecule of interest with the tag using a pulsed-jet molecular beam source. Use of the phrase enantiopure need not require absolute purity, but instead can refer to a specified enantioenrichment such as 95%, 99%, 99.5%, 99.9%, or other values.

This chiral-tagging rotational spectroscopy approach can be general, such as without requiring development of specific, expensive chiral resolving agents, unlike NMR and electronic spectroscopy techniques. Structure validation by isotopologue analysis can be performed using an isotope-enriched version of a racemic sample to provide confidence in the assignment of an absolute configuration. After basic analysis, high-sensitivity measurements can be used to provide enantiomeric excess measurements such as approaching or within a trace enantioimpurity limit. Without being bound by theory, a sensitivity of the chiral-tagging rotational measurement approach is expected to exceed the sensitivity of chromatographic techniques. A high-sensitivity measurement can be performed to produce a structure of the analyte/chiral-tag complex, and therefore the absolute structure of the molecule of interest can be determined when the tag absolute configuration is known, with an accuracy of the atom positions that exceeds the performance of X-ray diffraction.

FIG. 1 illustrates generally an example of an apparatus 100, such as can be used for performing one or more techniques shown and described elsewhere herein. The apparatus 100 can be used for performing rotational spectroscopy, such as for analysis of a sample within a sample cell 120. The sample cell can include a sample introduction port, such as a first input port 118A (e.g., a pulsed-jet injection port), to provide a complex including an analyte and a chiral tag, or the analyte alone, or the chiral tag alone, as illustrative examples. A second sample port 118B can be used to introduce a different sample, such as to provide a complex including the analyte and a chiral tag having a different, specified enantiopurity. The sample cell 120 can include an input 116 coupled to a signal source 106 to receive excitation signals. The signal source 106 can function as a waveform generator and can include one or more of an arbitrary waveform generator (AWG), a direct digital synthesizer (DDS), a comb synthesizer bank, or a combination or plurality of such sources.

The signal source 106 can be coupled to the sample cell such as through a power amplifier circuit 110A. A receiver circuit can include an analog-to-digital converter (124) (e.g., a digitizer). The receiver signal chain can include a low-noise amplifier (LNA) 110B. In an example, one or more of the source signal chain or the receive signal chain can include isolation circuits, such as a first switch 112A in the source signal chain, or a second switch 112B in the receive signal chain. In an example, a microwave isolator 114 or a circulator connected in an isolator configuration can be used, such as to inhibit signals emitted or reflected from the sample cell from being coupled back to the signal source 106. A frequency-domain spectrum can be obtained from the sample cell 120, such as by obtaining a time-domain representation of a response of a sample within the sample cell 120 using the ADC 124, and performing a fast-Fourier transform (FFT) or other frequency-domain transform on the time-domain representation. For example, one or more of the signal source 106 or the ADC 124 can be controlled using a processor circuit 102, and the processor circuit can be configured or can execute instructions to perform the FFT on the obtained time-domain representation. One or more of information to control the apparatus 100 or information obtained from the apparatus can be stored using a memory circuit 104. Other elements in the apparatus 100 can be controlled such as using the processor circuit 102.

As mentioned above, the signal source 106 can be configured to provide one or of the following:

a) Generation of a sequential frequency pulse waveform from an Arbitrary Waveform Generator (AWG). In this approach, an AWG can be used to create a waveform that has the set of excitation frequencies put together as a single sequential waveform "burst." The waveform can be phase continuous so that each "sub pulse" is an integer number of cycles. This waveform can also be input to a frequency multiplier or mixer to upconvert the waveform before providing it to the sample cell 120, such as when an operating frequency of the spectrometer exceeds a Nyquist frequency of the AWG due to the AWG having a fixed or relatively low sampling rate. An external microwave circuit can be used convert the AWG output range to the spectrometer operating range. If using an upconversion approach, to avoid creation of intermodulation (IM) signals, only a single frequency is generally input to the multiplier or mixer at any instant. An example of an AWG generated waveform showing five frequencies with a separation of 200 MHz (typical cavity FSR) and its Fourier transform is shown in the figures below in FIG. 3B and FIG. 3C, respectively.

b) Using a direct digital synthesizer (DDS) integrated circuit (IC) to generate a phase continuous sequence of excitation frequencies. A sequential frequency waveform can also be created using direct digital synthesizer (DDS) ICs. As an illustrative example, a DDS IC can generate a waveform using a high-precision "look up" table representation of a waveform, such as a sine wave. An output frequency can be determined by how many "lines" of the look up table are skipped on each clock cycle, and changing this "skip" value will can change an output frequency in a phase continuously manner. A DDS IC can have the ability to store a set of "skip" values so that a set of output frequencies can be rapidly accessed through a set of digital control lines. When using a DDS circuit to create the excitation waveform, an exact waveform can be repeated on each measurement cycle so that phase coherent signal averaging can be achieved.

c) Generation of a frequency comb. A frequency comb can be used to excite the cavity in a multiplexed manner. A chirped-pulse frequency comb can be used to generate comb frequencies that can be easily converted using mixers or frequency multipliers. The comb can be created using an AWG as in the first example, (a) above, or using other techniques. A challenge of a frequency comb approach can be that AWGs may generally lack time resolution to match a comb precisely to a tuning of the resonant cavity. For example, a high-speed AWG might operate at 25 gigasamples per second (Gs/s). Adding one additional point to the waveform is the equivalent of an additional light travel distance of about 1 centimeter (cm). To smoothly tune the resonator over one FSR might involve taking 200 distance steps covering a total of about 3 cm (according to illustrative example). Matching a frequency comb repetition rate to a round trip time of the cavity would generally involve a distance resolution of about 0.01 cm—two orders-of-magnitude higher than a 25 GS/s AWG.

d) Use of a bank of frequency synthesizers. In yet another example, the waveform can be created using a set of frequency synthesizers. The output of each synthesizer can be enabled such as using a switch or otherwise combined. For example, a multichannel digital pulse generator can control the output of each switch allowing just a single output frequency at any instant. Outputs of all frequency sources can be routed to an N-way power combiner to place the sequential signals on a single output channel port (e.g., an output 108). A waveform that has the same phase for each excitation pulse on each cycle of the measurement can be generated so that time-domain signal averaging of the molecular emission signal (e.g, free induction decay (FID)) can occur. This can be achieved by, for example, making all frequencies an integer multiple of a defined frequency. For example, if all output frequencies are multiples of 1 MHz, then the overall phase pattern repeats every microsecond and triggering on a time interval that is an integer multiple of one microsecond will provide phase coherence. A measurement repetition rate can be defined at least in part by a pulsed-valve system (and limited by the spectrometer vacuum pump speed), these times are typically in the millisecond regime so a small frequency step can be chosen as the base making all of the pulses essentially resonant with the cavity.

According to various examples, a pulsed "light" source (e.g., signal source 106) can have its power amplified such as using the power amplifier 110A before input to the cavity resonator through a coupling antenna. For detection of molecular emission, the amplifier 110A noise power output can be suppressed during the detection cycle. This can be achieved using the microwave switch 112A on the amplifier 110A output or by switching off the power to the amplifier 110A (e.g., a capability found in some microwave solid state power amplifiers). The apparatus 100 can provide an advantage over free-space Fourier transform microwave spectrometers because each excitation "color" can be passively amplified by a resonant cavity included as a portion of the sample cell 120. Accordingly, if a power amplifier 110A is used, it can include a compact solid-state amplifiers instead of a large, high-power-consumption traveling wave tube amplifier, as an illustrative example. The excitation waveform can contain significant power at frequencies reflected from the cavity, and the pulse generation system can include a microwave isolator 114 to decouple the excitation source and the cavity.

Following excitation by a set of cavity-enhanced excitation frequencies, the polarized spectroscopic transitions of the sample will radiate through free induction decay (FID). As mentioned above, these frequencies are generally detected in the time domain. Use of phase-coherent excitation and measurement permits accumulation of signals through averaging. The receiver signal chain generally includes a specified bandwidth to capture a range of frequencies through sampling of the time-domain representation. Various receiver signal chain topologies can be used. Such topologies can include:

a) A broadband receiver and high-speed digitizer to directly detect the signals, such as shown illustrative in FIG. 1.

b) Frequency downconversion with a single local oscillator. In certain applications, a spectrometer bandwidth might only cover a small frequency range, relative to the measurement frequency, to perform the spectral analysis. As an illustrative example, 2 GHz of measurement bandwidth may capture enough spectrum coverage so that an instrument operating from 6-8 GHz is used for certain applications. In such an illustrative example, a frequency downconversion receiver using a single local oscillator can be used to relax the digitizer bandwidth (e.g., a lower-bandwidth digitizer can be used). A single, local oscillator frequency used in this downconversion can lie outside the measurement bandwidth or inside it. For example, taking a lower sideband in a mixer using a local oscillator of 8.5 GHz would translate the detection band of the 8-10 GHz instrument to 0.5-2.5 GHz and thereby reduce the digitizer speed as compared to a direct-sampling approach.

c) Frequency downconversion with multiple local oscillators. A resonance structure of a high-Q cavity means that the multiplexed measurement at any single cavity length (which then defines the resonance frequencies) generally involves a small amount of actual measurement bandwidth relative to the absolute frequency and the frequency space. Such bandwidth is in the form of small frequency bands (from the resonance width of the cavity, such as defining about a 1 MHz band) separated by the larger frequency spacing of the $TEM_{00}$ resonance frequencies (with a frequency separation greater than 100 MHz). A multifrequency local oscillator can be used to downconvert each of the multiplexed detection windows into adjacent frequency channels at or near baseband within the digitizer's bandwidth, such as "squeezing out" the unused frequencies between the cavity resonances. This technique can be accomplished using a second chirped pulse frequency comb that can provide a set of sequentially offset local oscillator resonance frequencies.

As mentioned above, the techniques described herein generally include time-domain measurement of emitted radiation (FID) elicited by excitation of multiple modes of a resonant cavity included in the sample cell 120. These signals are measured with the ADC 124 (e.g., a digitizer) and the digitizer speed (e.g, sampling rate) is generally specified to be capable of capturing the frequencies of interest. For direct measurement of emissions from the sample cell 120, a digitizer is generally specified to operate at a minimum of twice the highest detection frequency (e.g, defining the Nyquist limit). In an example, a lower sampling rate digitizer can be used to "alias" the received signals as long as this does not produce channel overlap from different multiplexed measurements. A vertical (e.g., amplitude) resolution of the digitizer is also a consideration. To achieve noise reduction during signal accumulation (with noise reduction generally proportional to a square root of the number of measurements accumulated), a receiver noise generally spans at least the 1-bit (e.g., least significant bit) of the digitizer. The vertical resolution is also generally specified to capture the strongest molecular FID signal without clipping or other non-linearity.

Figure 2A:
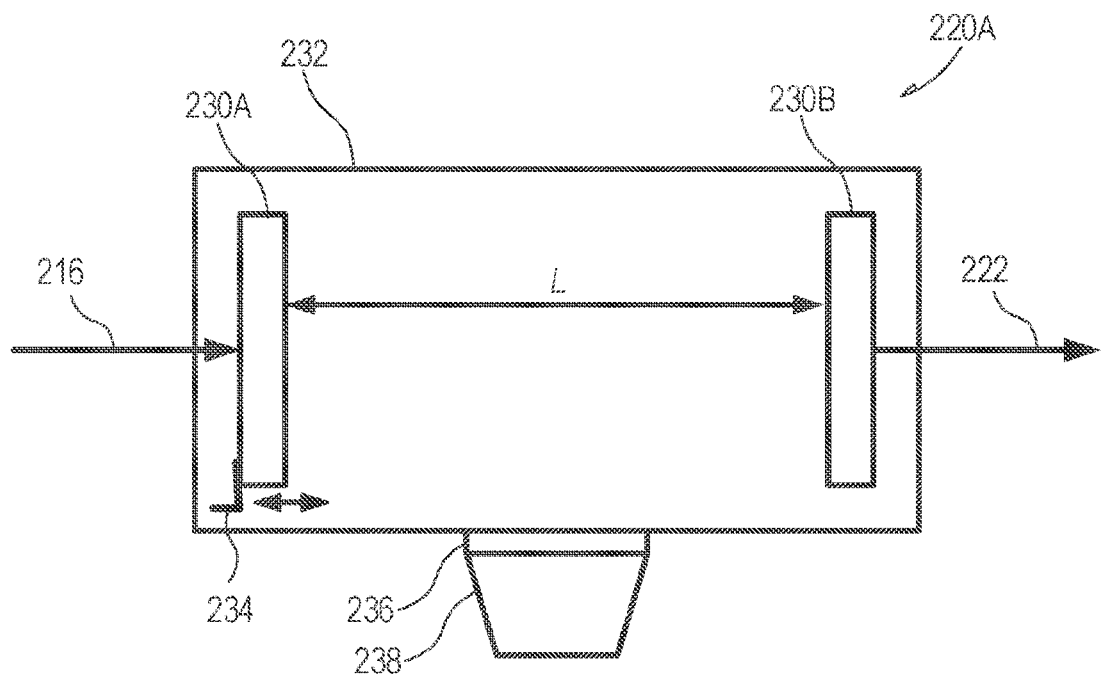
FIG. 2A and FIG. 2B illustrate generally examples of sample cell configurations (such as representing different views of a sample cell defining a resonant cavity), such as can be used for performing one or more techniques shown and described elsewhere herein.
Figure 2B:
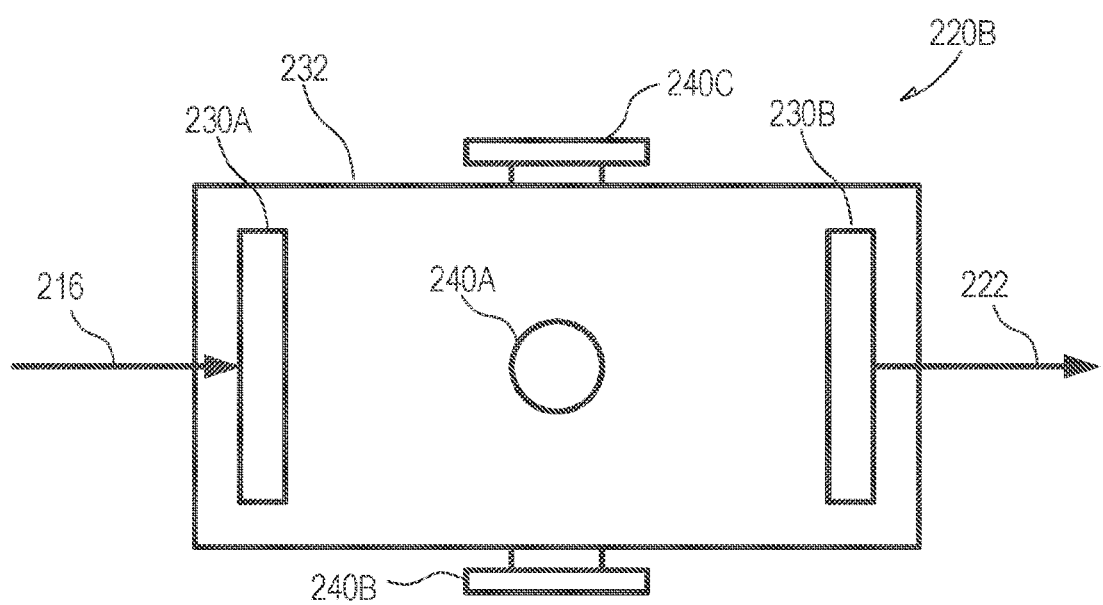

FIG. 2A and FIG. 2B illustrate generally examples of sample cell configurations 220A or 220B (such as representing different views of a sample cell 120 as shown in FIG. 1), such as can be used for performing one or more techniques shown and described elsewhere herein. For example, the sample cell configurations 220A and 220B can include features to provide the sample cell 120 shown in the apparatus of FIG. 1, for use in performing various techniques described elsewhere herein.

The sample cell configurations 220A and 220B can include reflectors or "mirrors" 230A and 230B to define a resonant cavity, such as spaced apart by a specified distance, "L," defining a cavity length. The dominant modes of a cavity resonator are the $TEM_{00n}$ longitudinal modes and these generally define a set of equally spaced resonances with a frequency spacing (the free spectral range, "FSR") determined by the cavity length.

$$FSR=c/2L \qquad [\text{EQN. 1}]$$

where "c" represents the speed of light and L can represent the cavity length. This FSR value represents a reciprocal of a round trip time for a signal to propagate in the cavity. The resonant cavity can be tunable, such as including one or more actuators (e.g, an actuator 234) such as to modify the distance, "L." Such actuators can include electromechanical or piezoelectric devices, such as arranged to be electronically-controlled as a portion of an automated or semi-automated measurement protocol.

Generally, the resonant cavity defined by the mirrors 230A and 230B can be housed within a evacuated cell housing 232, such as including a port 236 coupled to a vacuum pump 238 to at least partially evacuate the cell housing 232. An input 216 of the sample cell configurations 220A and 220B can be electrically coupled to a source to receive excitation. Such excitation can excite multiple cavity modes defined by the distance, "L." Following resonant excitation, a broadband molecular free induction decay (FID) signal can be digitized, such as using a digitizer electrically coupled to an output 222. Samples can be introduced an interior of the cell house 232, such as using one or more ports. In the illustrative example of FIG. 2B, three sample introduction or "input" ports 240A, 240B, and 240C are shown, but other combinations or counts of ports can be used. As an illustrative example, a first input port 240A can include a pulsed-jet injection port to provide a complex comprising an analyte molecule and a racemic mixture of a chiral tag. A second input port 240B can be used to provide a complex comprising the analyte molecule and a chiral tag having a specified enantiopurity, such as for use in determining an enantiomeric excess ("ee") of an enantiomer in the analyte. A third input port 240C can be used to provide a complex comprising the analyte and an isotopically-labeled chiral tag, such as for use in determining an absolute configuration of the analyte. Other configurations can be used, according to various examples, such as including a port to provide analyte, alone, or a chiral tag, alone, to provide a baseline measurement.

Generally, as mentioned above, the use of two separate pulsed-valve sample introduction systems (e.g., first and second input ports 240A and 240B) can provide, for example, samples for enantiomeric excess measurements. A third sample introduction system (e.g., third input port 240C) provides higher certainty for the determination of absolute configuration. There can be multiple sets of these sample systems to improve measurement sensitivity. The pulsed-jet valves for sample introduction can be arranged perpendicular to the cavity axis as shown illustrative in FIG. 2B, or such sample introduction ports can be mounted in the mirrors for coaxial sample introduction as is used in a "COBRA" configuration for Balle-Flygare instruments. Multiple-nozzle systems can be used to decrease measurement time and sample consumption.

A pulsed-jet injection port arrangement (instead of room-temperature gas cell or buffer gas cooled cell instrument) is generally used because the conversion of enantiomeric species to spectroscopically-distinguishable diastereomers is generally accomplished by forming a weakly-bound complex of the molecule of interest with a chiral tag. This complex can be formed through non-covalent interaction (e.g., hydrogen bonds, dispersion forces, or other interaction). For large molecule rotational spectroscopy, the strong cooling of the rotational temperature of the gas sample (e.g., to temperatures of 1-2K) is used to achieve high sensitivity.

Referring to the sample cell configurations 220A and 220B of FIG. 2A and FIG. 2B, a semiconfocal cavity using metal for the mirrors 230A and 230B can produce a high-Q cavity for signal enhancement. A mirror diameter can be specified to accommodate a desired low frequency operating range of the instrument. As mentioned below, mirror diameter can at least in part define diffraction losses, which can become the dominant loss mechanism in the instrument and limit the quality factor (Q) at lower frequencies. For larger molecules, rotational transitions with the strongest intensity (and, therefore, the transitions that can offer the highest detection sensitivity) move to lower frequency so the size of molecules to be analyzed can influence the specification of cavity mirror diameter.

A spectrometer instrument comprising the apparatus 100 of FIG. 1 and sample cell configurations shown in FIGS. 2A and 2B can provide an instrument that combines cavity-enhanced spectroscopy techniques with broadband Fourier-transform rotational spectroscopy techniques. Unlike a Balle-Flygare approach, the present subject matter can include use of multiple cavity modes to provide a multiplexed measurement using a single cavity, as an illustrative example. As discussed in relation to other examples below, such cavity modes can be excited serially or contemporaneously, and broadband emission from the cavity can be digitized to provide multiplexed measurement of cavity-enhanced spectra. The length, "L" can be stepped (e.g., adjusted) between broadband acquisitions, such as to provide coverage of a specified bandwidth through successive measurements using different cavity lengths. For example, making enough steps to cover a bandwidth on one cavity free spectral range then covers a corresponding broadband range that can be determined by the number of modes that are simultaneously excited. Alternatively, or in addition, multiple sample cells or cavities can be used to provide further multiplexing capability.

As an illustrative example, a Fourier-transform microwave (FTMW) instrument can include use of a cavity having a nominal separation between mirrors of 75 centimeters (cm), corresponding to a free spectral range of 200 MHz for the $TEM_{00n}$ modes. With a mirror diameter of about 40 cm, such an instrument configuration can perform well to a low frequency limit of about 5 gigahertz (GHz). At lower frequencies, diffraction losses at the mirror can reduce the cavity enhancement, such as eroding sensitivity. A quality factor (Q) for such an illustrative example is about 10,000, though it is believed that higher quality factors can be achieved. According to this illustrative example, if the cavity dimensions mentioned above are used in a multiplexed experiment to acquire a spectrum from 5-15 GHz, then 50 cavity modes can be excited simultaneously. Each acquisition can provide a broadband emission signal that is $Q^{1/2}$ stronger than a free-space, chirped pulse measurement lacking cavity enhancement. Noise generally drops as a function of the square root of the number of averaged spectrum acquisitions, so such cavity enhancement can correspond to reaching a specified signal-to-noise level in a duration shortened by a factor of Q compared to free-space measurements.

To cover a full spectrum, the spectrometer can be scanned through one free spectral range—such as covering the frequency range of 5000-5200 MHz, for example. Free spectral range changes generally depend inversely on the cavity length so that each successive $TEM_{00n}$ mode shifts slightly further and this leads to some overlap in the spectrum acquisition that can be removed by selection of the excitation pulse, if needed. The quality factor is generally defined as a ratio of a cavity bandwidth to its resonance frequency, and a cavity width in the 5000-5200 MHz range is about 0.5 MHz so about 400 separate measurements can be used to complete a multiplexed scan covering a desired 10 GHz frequency range, as an illustrative example. Even performing 400 separate measurements, a net result is that compared to a free-space, chirped pulse measurement, a full spectrum can be acquired with the same final sensitivity in (10,000/400) less time using a cavity-enhanced approach—a decrease in measurement time (and sample consumption) of a factor of 25.

A pulsed excitation signal source (e.g., such as to provide signals in at least one of the microwave region, the mm-wave region, or in the THz frequency range) generally provides an electrical excitation signal containing energy at a set of frequencies that match a specified set of cavity resonances. These cavity resonances can be determined analytically or measured for any mirror separation by impulse testing (or using a chirped excitation pulse across the desired operating range), and one or more of the cavity length or the signal source frequencies can be adjusted to align the signal source excitation with the specified set of cavity resonances. In creating the excitation waveform, a total duration of the pulse is generally short compared to a dephasing time of the molecular free induction decay (FID) signal. In rotational spectroscopy at microwave frequencies (e.g., from about 2 to about 40 GHz) this time scale is about 50-100 microseconds using pulsed jet sample sources. A total excitation pulse duration of about 5 microseconds can be used, as an illustrative example. For the illustrative example above where there are 50 cavity modes excited in each measurement cycle, then each individual excitation pulse can have a duration of about 100 ns.

Figure 3A:
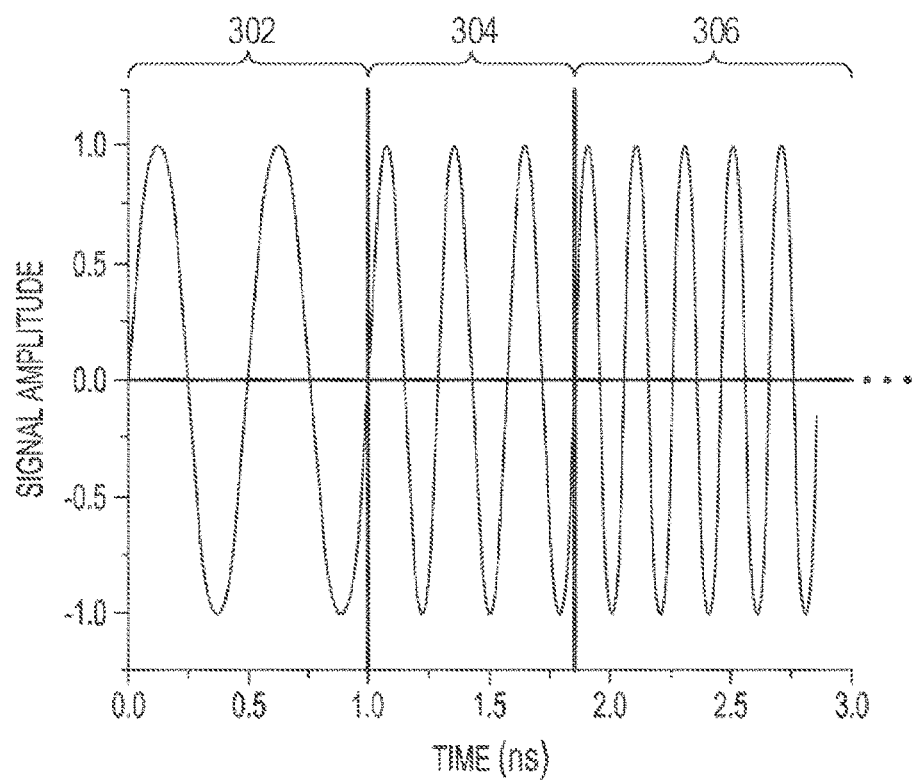
FIG. 3A illustrates generally an illustrative example including an excitation waveform comprising a sequence of frequencies, where the frequencies can be established to match resonances of a resonant cavity.

FIG. 3A illustrates generally an illustrative example including an excitation waveform comprising a sequence of frequencies, where the frequencies can be established to match resonances of a resonant cavity. As mentioned above, a waveform profile that can be used to perform the multiplexed Fourier transform measurement can include target frequencies output in sequential form. This form of sequential pulse is suitable for use in excitation schemes where the excitation waveform is convened in frequency using frequency multipliers that can have strong nonlinear conversion behavior. The illustrative example of FIG. 3A comprises a waveform that is phase continuous and is constructed by using an integer number of cycles for each distinct excitation frequency, corresponding to the durations 302, 304, and 306. All pulses are chosen to have approximately the same pulse duration (with variations coming from the use of integer numbers of cycles to construct the "continuous" waveform). The amplitude of the separate pulses in the sequential excitation waveform can be tailored to account for instrument variations in the cavity quality factor (Q) or other frequency-dependent amplitude variations in the system, as needed.

Figure 3B:
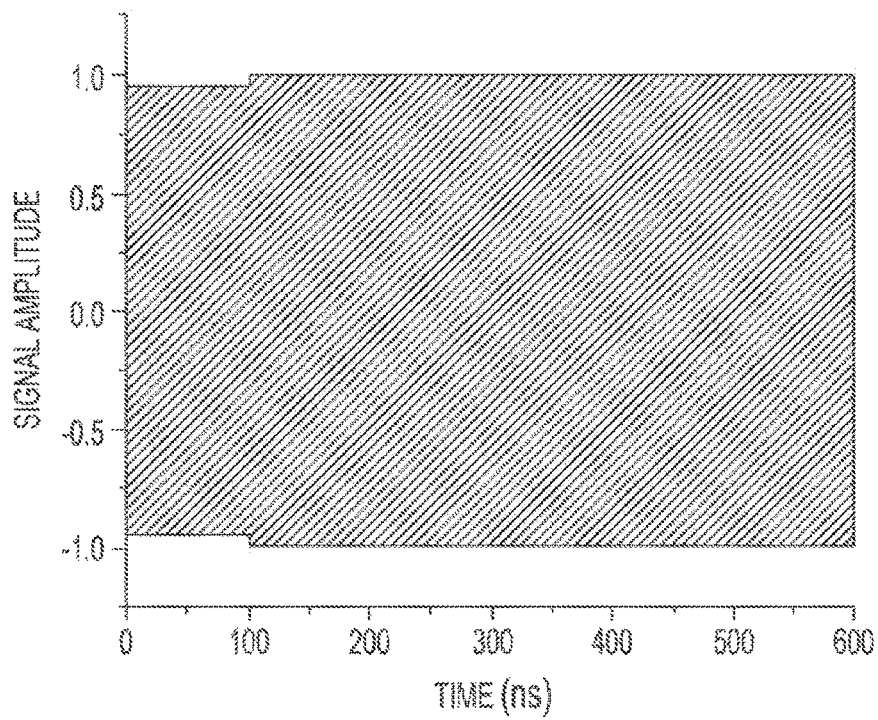
FIG. 3B illustrates generally an illustrative example of a pulse sequence, similar to FIG. 3B, containing six pulses at 5000, 5200, 5400, 5600, 5800, and 6000 megahertz (MHz) with each burst having a duration of approximately 100 nanoseconds.
Figure 3C:
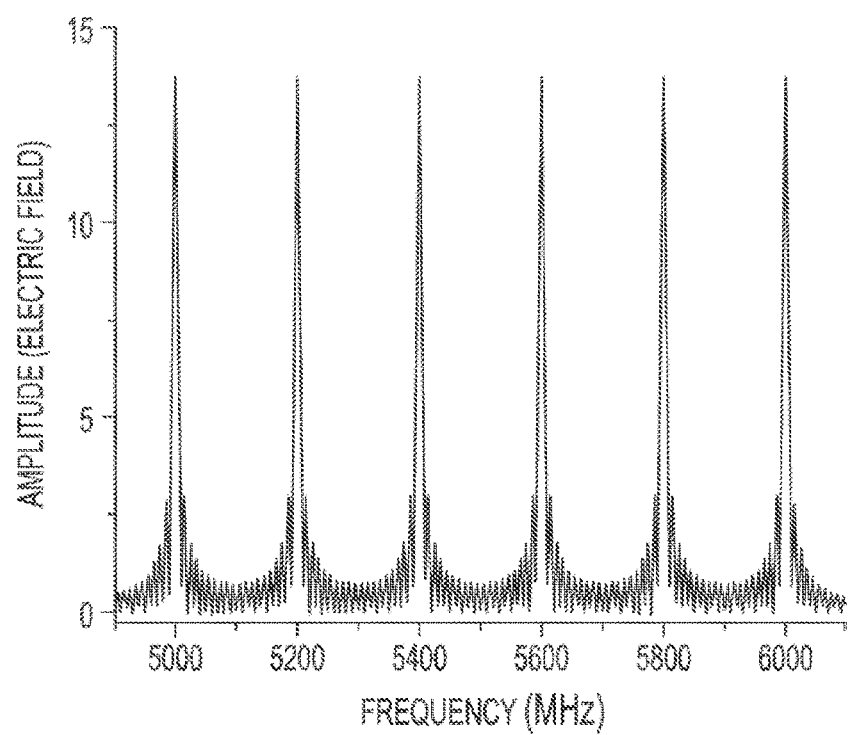
FIG. 3C illustrates generally an illustrative example of a frequency-domain representation of the pulse sequence of FIG. 3B.

FIG. 3B illustrates generally an illustrative example of a pulse sequence, similar to FIG. 3B, containing six pulses at 5000, 5200, 5400, 5600, 5800, and 6000 megahertz (MHz) with each burst having a duration of approximately 100 nanoseconds and FIG. 3C illustrates generally an illustrative example of a frequency-domain representation of the pulse sequence of FIG. 3B. The example of FIG. 3B can be generated using an AWG to provide six frequencies having a separation of 200 MHz (corresponding to a cavity FSR in this illustrative example) and a corresponding Fourier transform shown in FIG. 3C. In this example, the amplitude is equal for all of the pulses in the sequential waveform (the small variations observed are artifacts from digitization where waveform is sampled in the time domain). Because each pulse in FIG. 3B can be considered to have a rectangular amplitude profile truncating the pulse, the frequency domain representation of FIG. 3C shows a sinc-function amplitude behavior for each frequency.

Figure 3D:
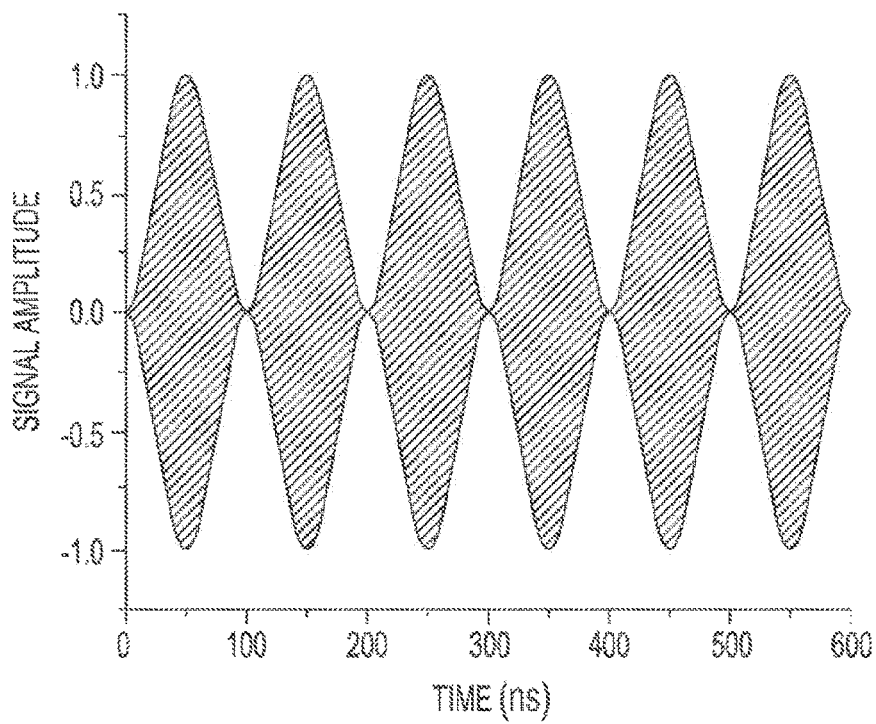
FIG. 3D illustrates generally an illustrative example of a pulse sequence, similar to FIG. 3B, but having envelope shaping of each burst, such as established using a tapered cosine windowing function.

FIG. 3D illustrates generally an illustrative example of a pulse sequence, similar to FIG. 3B, but having envelope shaping of each burst, such as established using a tapered cosine window function.

Figure 3E:
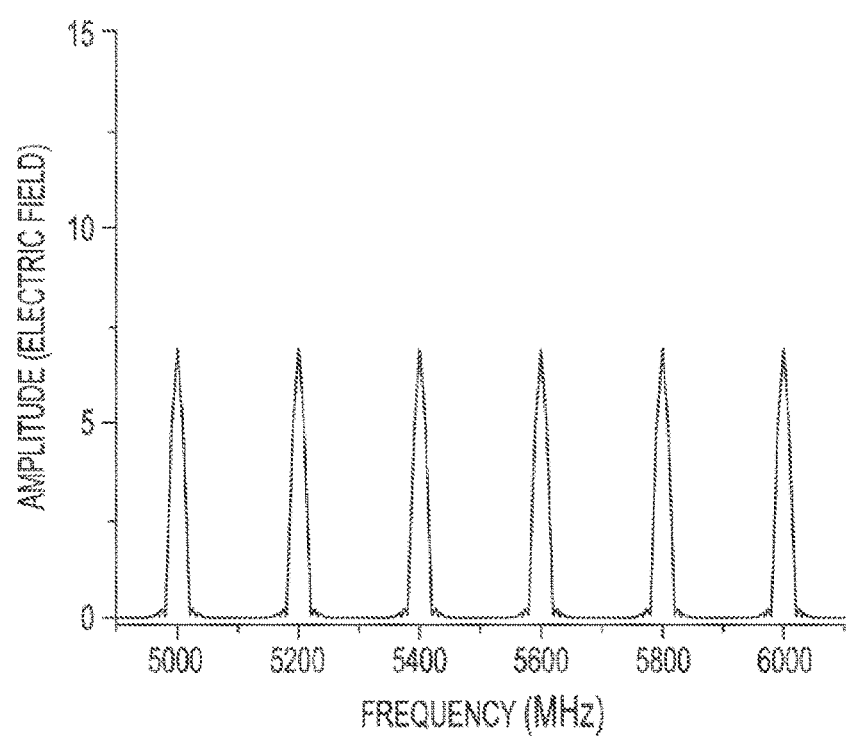
FIG. 3E illustrates generally an illustrative example of a frequency-domain representation of the pulse sequence of FIG. 3D, illustrating generally the suppression of frequency-domain side-lobes, such as to provide better separation between or suppression of leakage between the excitation frequencies.

FIG. 3E illustrates generally an illustrative example of a frequency-domain representation of the pulse sequence of FIG. 3D, illustrating generally the suppression of frequency-domain side-lobes, such as to provide better separation between or suppression of leakage between the excitation frequencies. An AWG-based pulse generation can be used to shape a "micropulse" profile for each of the sequential, single-frequency pulse bursts. For example, such windowing or shaping of a burst profile reduces the "spectral leakage" of the excitation spectrum so that unwanted (off-axis) cavity modes are not excited Suppression of unwanted modes can reduce a reflected power from the cavity by reducing the power at frequencies where there is no resonant coupling. Several amplitude shaping profiles can be used, such as including the use of a tapered cosine window or the use of a Gaussian-shaped amplitude profile. A cosine taper is used in the examples of FIG. 3D and FIG. 3D Amplitude-shaped or windowed time-domain waveforms can be used when an AWG is used to excite the resonant cavity without upconversion (e.g., without mixing) or in cases where frequency conversion occurs using a mixer that offers linear conversion efficiencies.

A sequential excitation waveform is generally established such that only a single frequency is present in the waveform at any time. This behavior reduces nonlinear effects in subsequent circuit elements that can distort the waveform. In particular, the ability to use a frequency multiplier or mixer to upconvert the frequency of the excitation pulses can be desirable because it makes it possible to use lower-sample-rate waveform sources (AWGs and DDS chips), such as simplifying the source circuitry or reducing cost. Multipliers and mixers can generate strongly distorted waveforms from all of the possible intermodulation tones that can be created in a multicolor pulse. Other devices, like amplifiers that also may be used in the pulse generation subsystem can also produce strong intermodulation distortion.

Figure 4A:
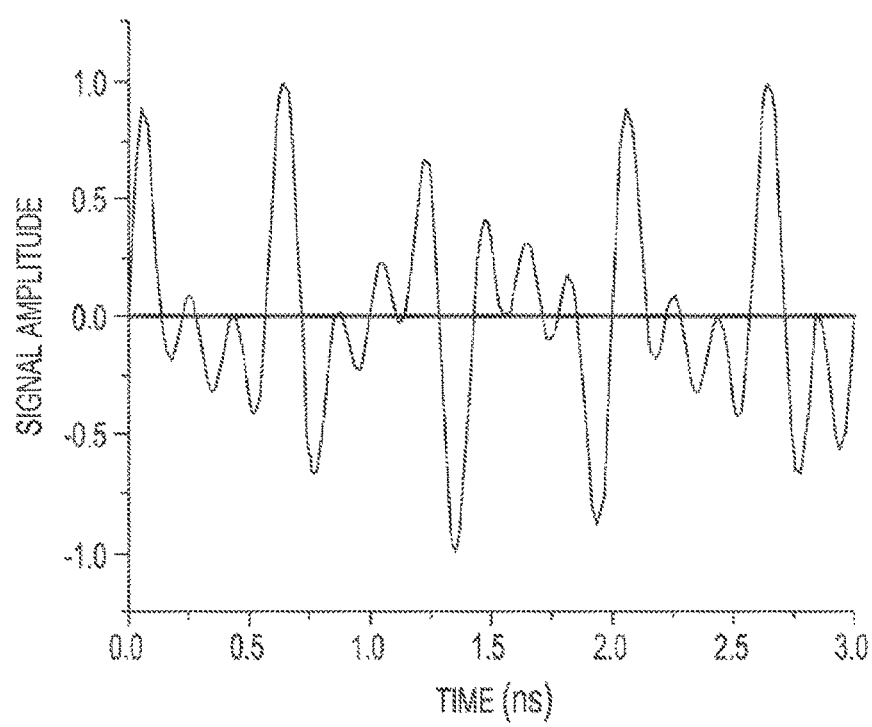
FIG. 4A illustrates generally an illustrative example of a waveform comprising three excitation frequencies for use in contemporaneously exciting multiple modes of a resonant cavity.

In examples where an AWG is available with a sample rate sufficient to cover the frequencies of interest (e.g., a sample rate that at least exceeds the Nyquist limit of twice the highest frequency being generated) it is possible to generate a waveform where the individual cavity excitation pulses overlap completely or partially in time (e.g., to provide contemporaneous excitation at multiple frequencies as shown generally in FIG. 4A).

FIG. 4A illustrates generally an illustrative example of a waveform comprising three excitation frequencies for use in contemporaneously exciting multiple modes of a resonant cavity. In FIG. 4A, three excitation frequencies are used and are the same as those for the phase continuous sequential of FIG. 3A. However, in this example all three frequencies are present over the full pulse duration (e.g., 3 ns) giving contemporaneous output of the three "colors." Such contemporaneous output produces a highly structured waveform from the constructive and destructive interference of the constituent frequencies.

Figure 4B:
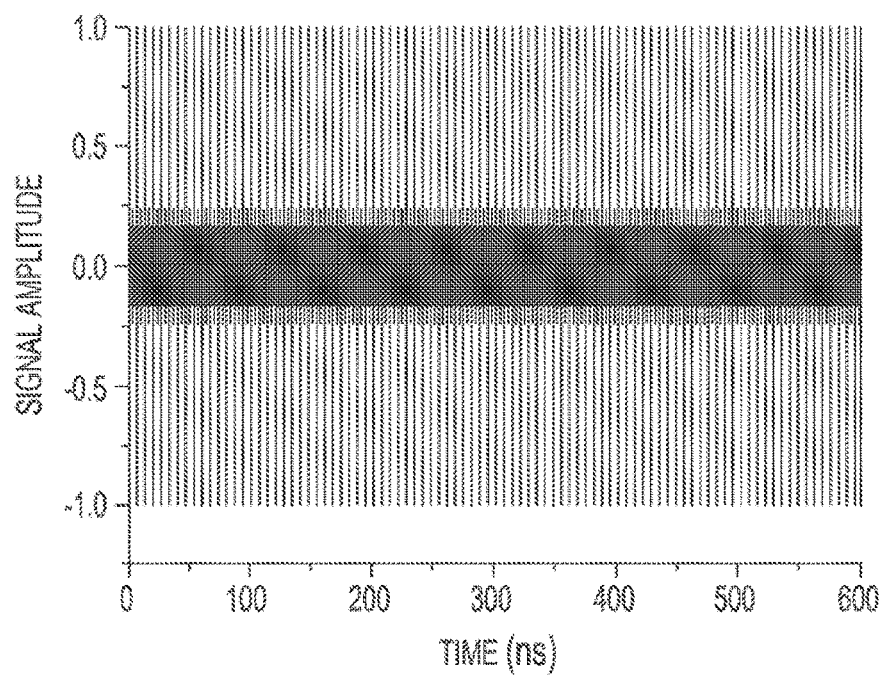
FIG. 4B illustrates generally an illustrative example of 600 nanosecond-duration burst of the waveform having six constituent frequencies.
Figure 4C:
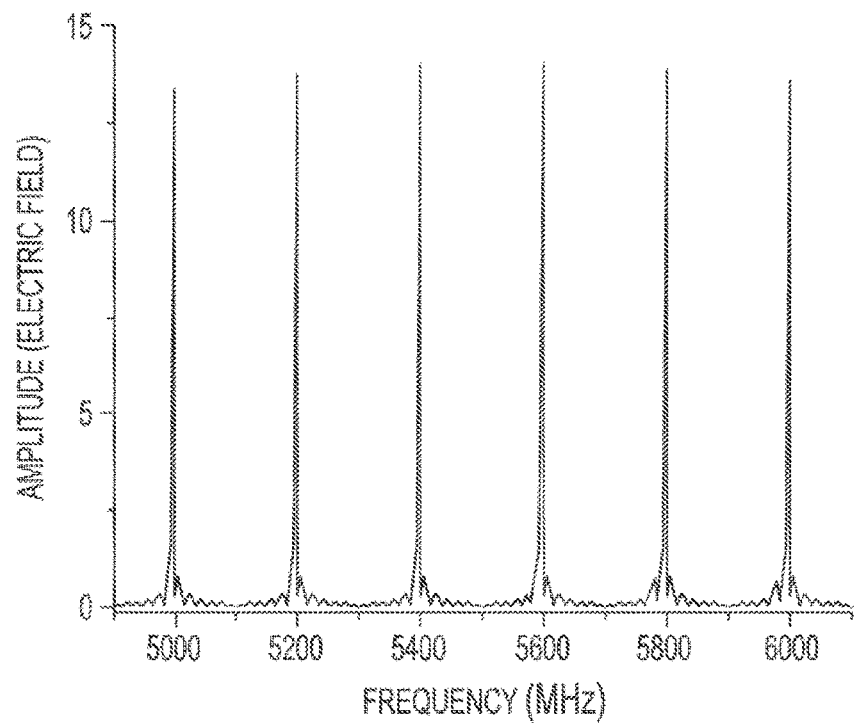
FIG. 4C illustrates generally an illustrative example of a frequency-domain representation of the waveform of FIG. 4B.

FIG. 4B illustrates generally an illustrative example of 600 nanosecond-duration burst of the waveform having six constituent frequencies, and FIG. 4C illustrates generally an illustrative example of a frequency-domain representation of the waveform of FIG. 4B. Because each "color" or constitutent frequency can be present over an entirety of the burst duration (e.g., 600 ns instead of 100 ns as compared to FIG. 3B), the frequency domain peaks show narrower bandwidth in the frequency domain.

Figure 4D:
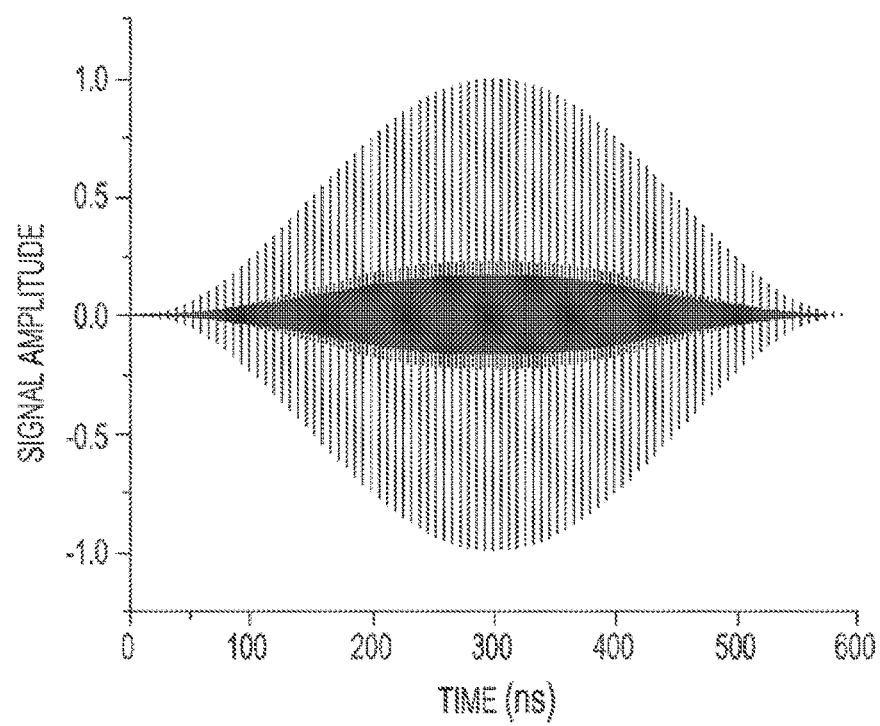
FIG. 4D illustrates generally an illustrative example of a waveform, similar to FIG. 4B, but having envelope shaping of the waveform over an entirety of the 600 nanosecond duration, such as established using a tapered cosine window function.
Figure 4E:
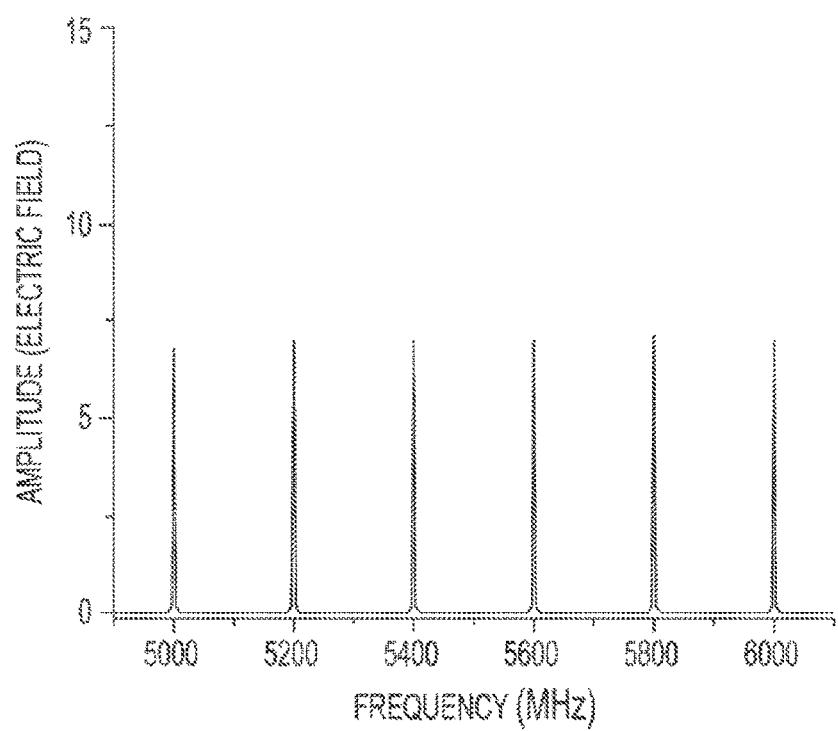
FIG. 4E illustrates generally an illustrative example of a frequency-domain representation of the pulse sequence of FIG. 4D, again illustrating generally the suppression of frequency-domain side-lobes, such as to provide better separation between or suppression of leakage between the excitation frequencies.

FIG. 4D illustrates generally an illustrative example of a waveform, similar to FIG. 4B, but having envelope shaping of the waveform over an entirety of the 600 nanosecond duration, such as established using a tapered cosine windowing function and FIG. 4E illustrates generally an illustrative example of a frequency-domain representation of the pulse sequence of FIG. 4D, again illustrating generally the suppression of frequency-domain side-lobes, such as to provide better separation between or suppression of leakage between the excitation frequencies.

FIG. 5 illustrates generally an illustrative example of a technique, such as can include forming a complex of an analyte, and a racemic mixture of a chiral tag, obtaining a corresponding frequency-domain rotation spectrum, and forming a complex of the analyte and an enantiopure form of the chiral tag, and obtaining another frequency-domain rotation spectrum, such as to distinguish between diastereomers within the analyte or to assist in determining an absolute configuration of the analyte. For example, at 502, diastereomer complexes comprising a racemic mixture of a propylene oxide chiral tag and solketal can be formed to provide one or more of an S-(+)-solketal complex 508 (where the analyte is S-(+) solketal) or an (R)-(−)-solketal complex 510 (where the analyte is R)-(−)-solketal). A first spectrum can be obtained, such as including contributions from both complexes 508 and 510 when present in an analyte sample of unknown enantiopurity. At 504, an enantiopure form (e.g., a form having a specified enantiomeric enrichment) of the chiral tag can be provided in combination with the analyte to form a diastereomer complex having a distinct molecular rotational spectrum as compared to the first spectrum. In this illustrative example, because S)-(−) propylene oxide 512 was used, the resulting S-(+) solketal 514 diastereomer complex is formed and can be detected, even if the S-(+) solketal enantiomer was less abundant in the analyte sample, because use of an enantiopure form of the chiral tag can suppress formation of the complex 516 comprising the R-(−) solketal enantiomer.

Figure 6A:
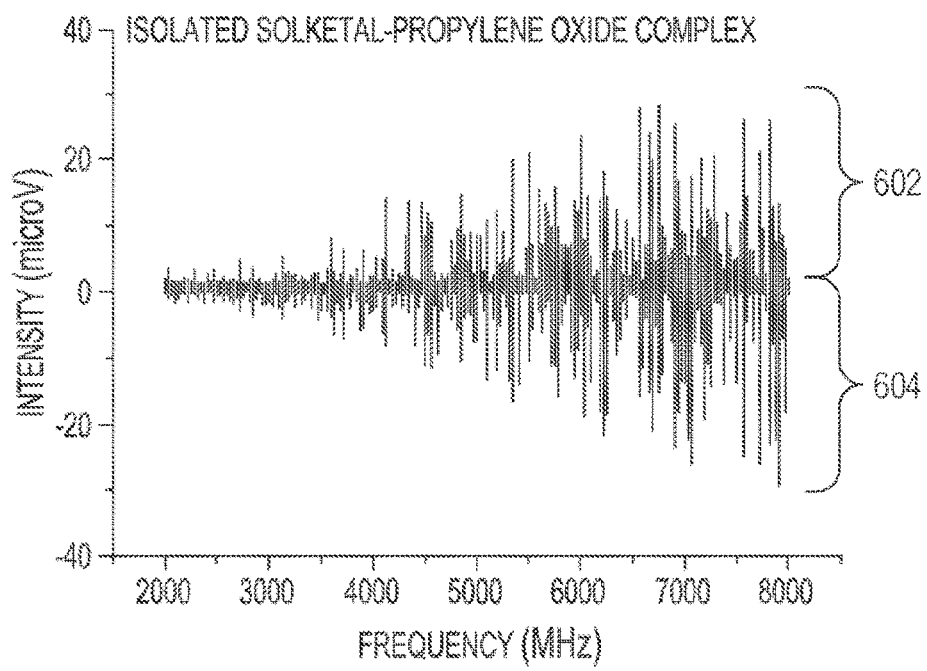
FIG. 6A illustrates generally a rotational spectrum showing transitions for a complex of (S)-solketal and a racemic propylene oxide tag; along with assigned spectra for two diastereomers complexes of solketal-propylene oxide.

FIG. 6A illustrates generally an experimentally-obtained rotational spectrum showing transitions for a complex of (S)-solketal and a racemic propylene oxide tag at 602; along with assigned spectra for two diastereomers complexes of solketal-propylene oxide at 604. The assigned spectra at 604 can be established using theoretical modeling to determine rotational constants and dipole moment directions, corresponding to each of the diastereomer complexes. In the illustration of FIG. 6A, the dipole information is not modeled correctly in the assigned spectra, but the technique still shows an ability to distinguish between the diastereomer complexes as discussed below.

Figure 6B:
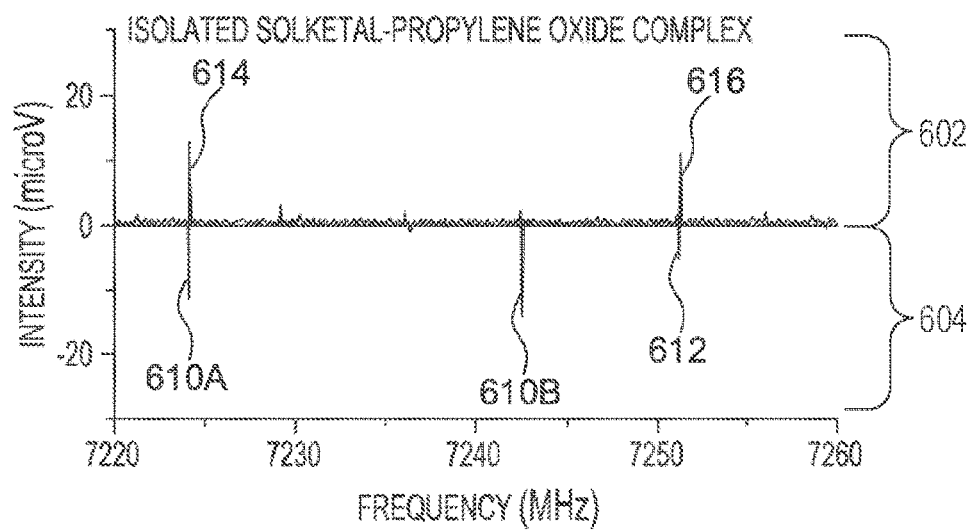
FIG. 6B illustrates generally the same spectra as shown in FIG. 6B, but having expanded scale.
Figure 6C:
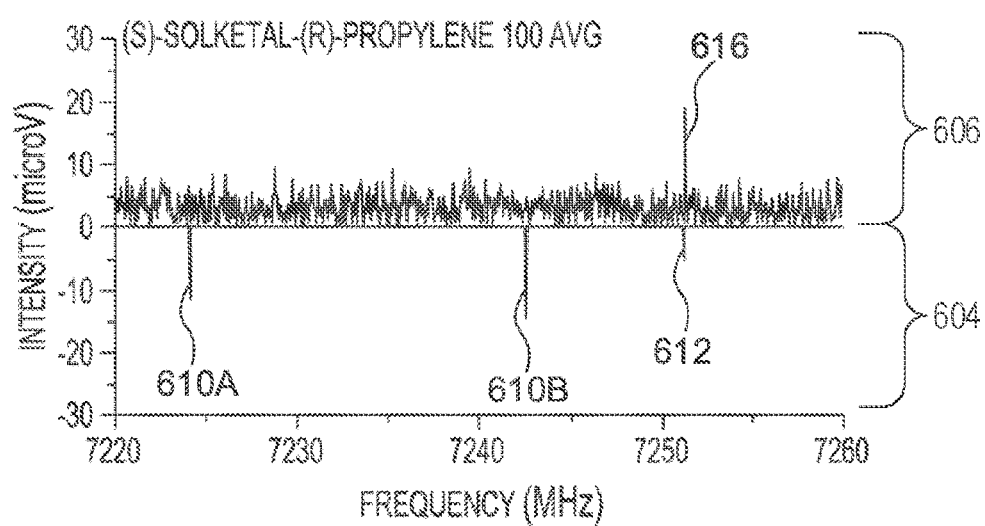
FIG. 6C illustrates generally another frequency-domain rotation spectrum obtained from a complex of (S)-solketal and enantiopure (R)-(+)-propylene oxide, along with the assigned spectra from FIGS. 6A and 6B, illustrating generally that a peak from one of the assigned diastereomers spectra remains, but the peaks corresponding to the other assigned diastereomer are absent.
Figure 7A:
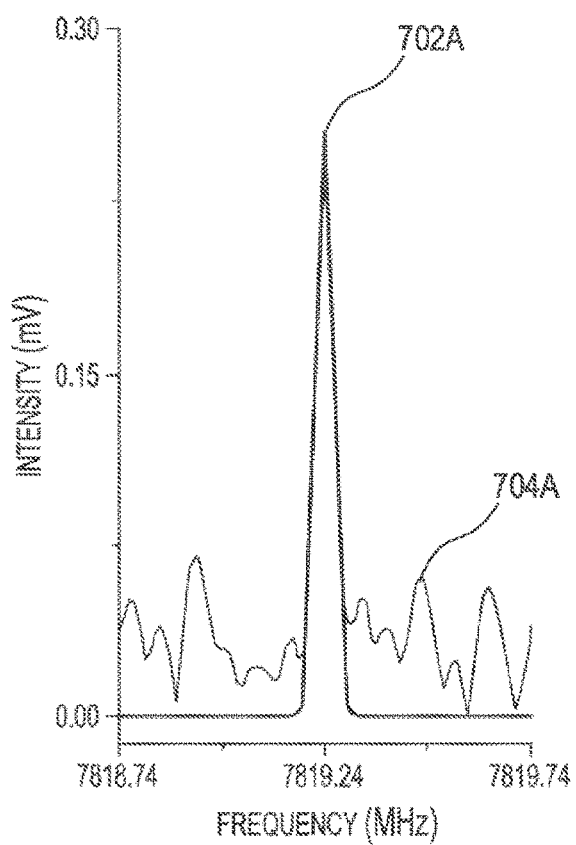
Figure 7B:
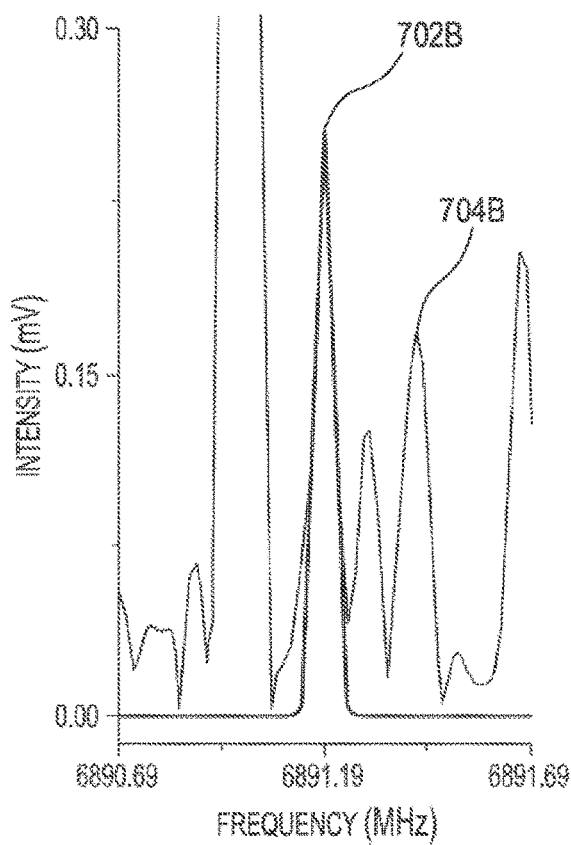

FIG. 6B illustrates generally the same spectra as shown in FIG. 6B, but having expanded scale. In FIG. 6B, peak locations 614 and 616 correspond to peaks 610A and 612 respectively in the assigned spectra at 604. The peak 610A can be associated with an assigned spectrum of one diastereomer of the solketal-propylene oxide complex, and the peak 612 can be associated with another diastereomer of the solketal-propylene oxide complex. FIG. 6C illustrates generally another experimentally-obtained frequency-domain rotation spectrum obtained from a complex of (S)-solketal and enantiopure (R)-(+)-propylene oxide, along with the assigned spectra at 604 from FIGS. 6A and 6B, illustrating generally that a peak 616 aligned with one of the assigned diastereomers spectral peaks 612 remains, but the peaks 610A and 610B corresponding to the other assigned diastereomer are absent. Accordingly, the spectrum 606 indicates the presence of (S)-solketal.

FIG. 7A, FIG. 7B, FIG. 7C, and FIG. 7D illustrate generally illustrative examples of experimentally-obtained rotational transitions of a homochiral solketal-propylene oxide complex (e.g., (S)-solketal with (S)-propylene oxide shown as spectra 702A, 702B, 702C, and 702D), along with measurements of a commercially-available sample of (S)-solketal and (R)-propylene oxide (shown as spectra 704A, 704B, 704C, and 704D). In the measurements where commercial samples of (S)-solketal and (R)-propylene oxide were used, the homochiral complex is present as at low abundance. The spectra 702A, 702B, 702C, and 702D are scaled down uniformly in each plot by a factor of 200 to align the respective peak magnitudes with the peaks in the spectra 704A, 704B, 704C, and 704D. Accordingly, a determined enantiomeric enrichment for the commercial sample of (S)-solketal is 99%. The relative transition intensities are the same where the peaks (e.g., 702A and 704A) are aligned, indicating that there are no other spurious transitions contributing to the signal at these frequencies. In this illustrative example of experimentally-obtained information, an ee of the propylene oxide tag has not been calibrated so it is unclear in this measurement how much of the indicated 0.5% of homochiral complex results from the enantiopurity of the molecule of interest (solketal) instead of the enantiopurity of the chiral tag (propylene oxide).

Figure 8:
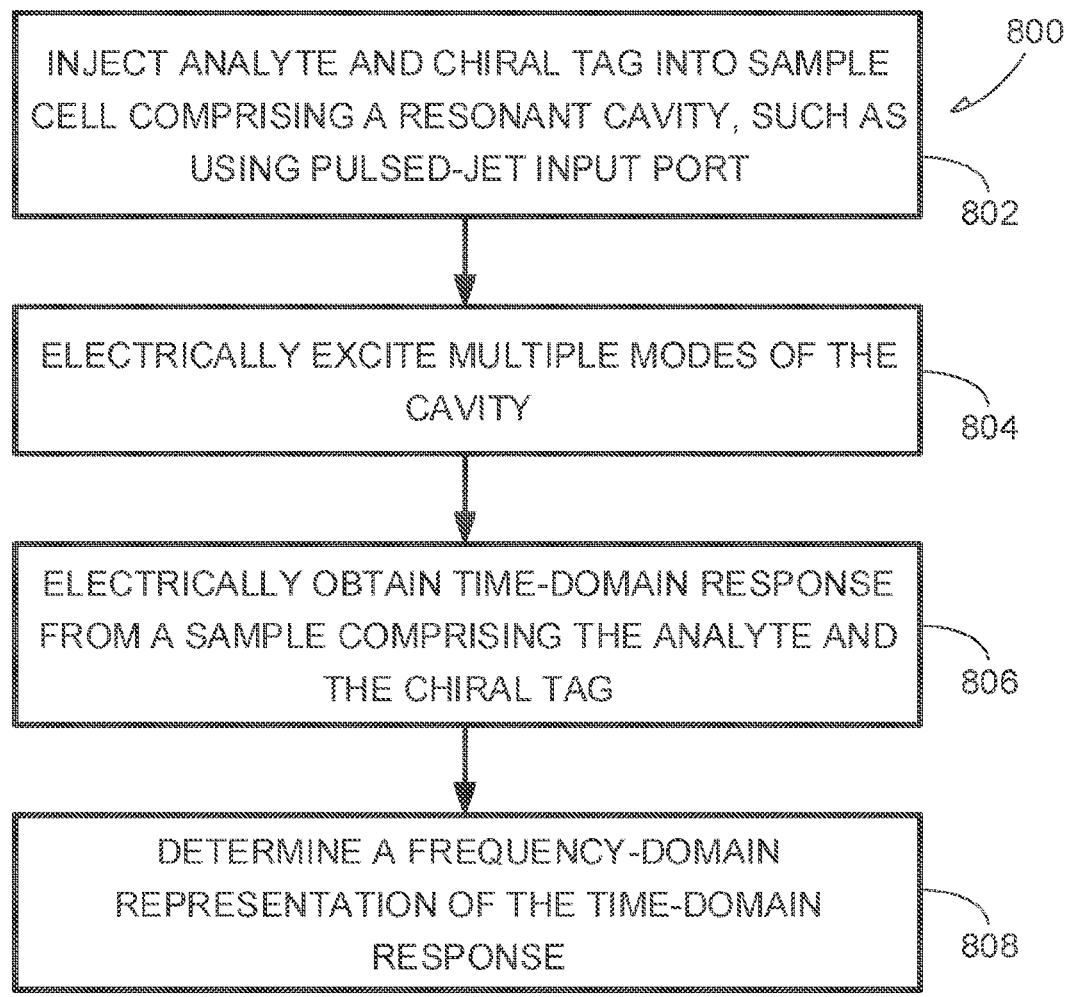
FIG. 8 illustrates generally a technique, such as a method, that can include injecting an analyte and a chiral tag into a sample cell comprising a resonant cavity, such as using a pulsed-jet input port.

FIG. 8 illustrates generally a technique 800, such as a method, that can include injecting an analyte and a chiral tag into a sample cell comprising a resonant cavity, such as using a pulsed-jet input port at 802. At 804, multiple modes of the resonant cavity can be excited either sequentially or contemporaneously. At 806, an emission from the sample can be obtained electrically, such as to capture a time-domain response corresponding to the multiple modes of the resonant cavity that were excited at 804. At 808, a frequency-domain representation of the time-domain response can be determined, such as using a Fast Fourier Transform (FFT) performed on time-domain information obtained at 806. According to various examples, one or more time-domain or frequency domain responses can be aggregated and a central tendency can be determined, such as an arithmetic average of obtained time-domain or frequency-domain responses.

Figure 9:
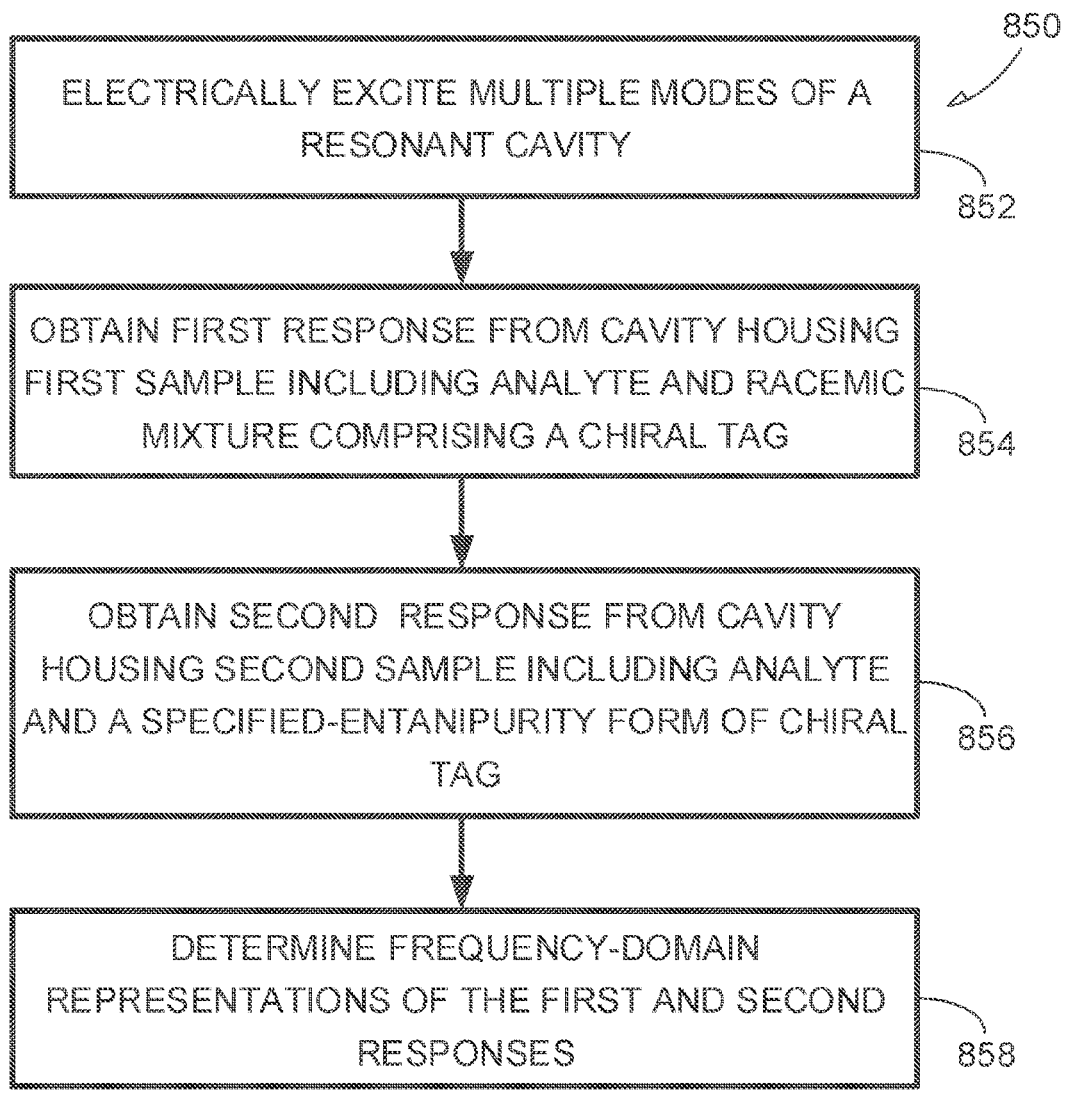
FIG. 9 illustrates generally a technique, such as a method, that can include obtaining a first response from a cavity housing a first sample including an analyte and a racemic mixture comprising a chiral tag, and obtaining a second response from the cavity housing the analyte and a specified-enantiopurity form of the chiral tag.

FIG. 9 illustrates generally a technique, such as a method, that can include obtaining a first response from a cavity housing a first sample including an analyte and a racemic mixture comprising a chiral tag, and obtaining a second response from the cavity housing the analyte and a specified-enantiopurity form of the chiral tag. The techniques of one or more of FIG. 8 or FIG. 9, or other techniques described herein, can be performed such as using the apparatus described at FIG. 1 and FIG. 2, or using apparatus as described elsewhere herein. The examples below can be combined with other examples herein or can provide further details regarding aspects such as processing conditions or configuration of the apparatus used for cavity-enhanced Fourier-transform rotational spectroscopy for performing chiral analysis.

Example: Sample Measurement and Creation of Diastereomer Chiral Tag Complexes

In an example, an apparatus, such as shown in FIG. 1 and FIG. 2 can be used to perform an initial rotational spectroscopy screening. Various sample holder configurations can be used. Many of the molecules of interest can be liquids or solids, and a gas phase sample can be produced. Reservoir nozzles can hold a sample near the pulsed nozzle orifice and use heat to generate sufficient vapor pressure (e.g., using about 1 Torr). Laser ablation can include combining a sample with a binder and then ablating the material into the gas phase with a short-pulse-duration laser. A gas stream of inert gas can be used to entrain the molecule of interest for expansion into a vacuum chamber to create a pulsed-jet expansion. In a nozzle system, an inert gas stream can be supplied by two sources One source can include "pure" inert gas, e.g., helium, neon, or argon or mixtures of these, as illustrative examples. Using this gas stream first gives the rotational spectrum when only the molecule of interest is present (e.g., where no chiral tag is used). This reference spectrum can be used to validate the sample if necessary.

A second gas stream can be supplied to a pulsed nozzle system to provide a mixture of the inert gas with a racemic sample of the chiral tag. The chiral tag can be dilute in this second gas stream (e.g., 0.1-1% has been used to provide the experimentally-obtained results described in this document, but other concentrations can be used). Because the tag molecules tend to be small, they generally have enough vapor pressure to make gas mixtures in external gas cylinders of using an external reservoir that keeps a relatively fixed, high pressure of the inert gas in equilibrium with the vapor of the tag molecule that is present in the reservoir (generally as a liquid). When the instrument switches to this gas stream, a spectrum containing the diastereomeric complexes of the enantiomers for the molecule of interest is acquired by entraining the molecule in an inert gas stream that also includes the chiral tag.

From these measurements, the spectra of the diastereomer complexes can be isolated by identifying transitions that do not appear in the spectrum of the molecule being analyzed (first measurement) or in a reference spectrum of the racemic chiral tag gas mixture. The reference spectrum for the chiral tag can be obtained beforehand and can be reused for any analysis that uses the chiral tag that has been characterized.

If a measurement involves the determination of absolute configuration, then the spectra of the chiral tagging complexes can be analyzed. After isolating the transitions that are attributed to the tagged complexes—by the fact they are only observed when both the molecule of interest and the tag are present—the spectra for the complexes can be assigned. Generally, there are estimates of the structures of complexes that might form available from computational chemistry. These structures provide input for estimated spectroscopic parameters that can guide the analysis process. Once a spectrum is assigned, then there is reasonable knowledge of the structure of the two diastereomeric complexes produced by association of the chiral tag with the enantiomers of the molecule of interest. In some cases, an enantiomeric excess determination may not need to know which enantiomer is dominant (e.g., additional chemical information might be available that makes this determination). The ee measurement can be performed without the need to assign the spectra to determine the absolute configuration.

Example: Enantiopure Chiral Tag Complex Production

To perform absolute configuration determinations, a spectrum can be acquired using the sample system mentioned above to provide a gas mixture with an enantiopure chiral tag sample. This system can be used to transfer the knowledge of a known absolute configuration of the tag to the analysis of the spectra of the diastereomeric complexes. The purpose of this measurement is to see which of the diastereomer complex spectra remain upon switching to an enantiopure tag, as shown illustratively in FIG. 6B and FIG. 6C. This then confirms that the spectrum has a known configuration at the tag chiral center (or more generally that the tag has a known enantiomer absolute structure). Absolute configuration of the molecule of interest is then determined by the theoretical structure that has been attributed to this assigned spectrum. Comparison to theory is an element of the analysis and correct analysis generally involves identifying the experimental complex geometry by theory.

As shown in FIG. 6C, this analysis can simply be a "yes" or "no" result to see if the molecule-tag complex is still present. Using the cavity-enhanced measurement capabilities of a Fourier Transform instrument, a signal strength at a few specific, assigned rotational transition frequencies can confirm the presence or absence of the complex in reduced measurement time as compared to a broadband approach where a broad range of frequencies are analyzed.

In cases where an absolute configuration is to be established, the structure analysis capabilities of rotational spectroscopy can be used. For example, the positions of individual atoms in the molecule can be determined by analyzing the rotational spectra of isotopologues. Using this approach, which in most cases would involve measurement sensitivity to detect the isotopologues in natural abundance (like $^{13}C$ at 1% relative natural abundance), the structure of the complex between the molecule and the enantiopure chiral tag can be determined. The structure determination would be consistent with two enantiomers. If a chirality of the molecule and tag are denoted using their optical rotation designation, (+) or (−), then the structure of the complex could be either enantiomer of the known diastereomer pair. For example, if the spectroscopic analysis shows that the complex is formed from a homochiral pair, then the enantiomer possibilities are:

$$(+)(+) \leftrightarrow (-)(-) \quad \text{[EQN. 2.]}$$ 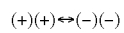

where the first optical rotation designation is for the molecule and the second for the tag.

Because the optical rotation of the enantiopure tag molecule is generally known in the experiment, the exact enantiomer for the complex can be known. If the chiral tag is (+), then it is known that the configuration of the molecule of interest is (+) and the measurement will now produce an absolute structure of the molecule with knowledge of the absolute configuration.

To perform ee determination, a spectrum can be acquired at high sensitivity using the enantiopure tag (a quantitative measurement of the tag enantiopurity can be determined separately and can come from other techniques, like chiral gas chromatography, or by analysis using the instrument being described). The high spectral resolution of the molecular rotational spectroscopy detector gives completely resolved spectral transitions for the diastereomer complexes so that the abundance of each diastereomer can be determined using the spectrum obtained with a racemic tag as the calibration. Significant measurement time reduction compared to broadband chirped pulse Fourier transform microwave spectrometers (and, therefore, reduction in sample consumption) can be achieved through use of a multiplexed cavity-enhanced Fourier Transform instrument configuration as shown and described herein.

As mentioned elsewhere herein, a sample introduction system (e.g., pulsed-jet sample port) for the enantiopure tag molecule can be a separate pathway to avoid cross contamination with the racemic complex. This cross contamination might generally compromise the accuracy of enantiomeric excess measurements in the high enantiopurity regime by creating both monitored diastereomer spectra from a single enantiomer.

Example: Isotopic-enriched Chiral Tag for Absolute Configuration Validation

Confidence in the determination of an absolute configuration of a molecule being analyzed can be improved using an isotope-enriched chiral tag Using this technique, an absolute configuration of the molecule can be assigned by a comparison of a theoretically-determined structure to a measured rotational spectrum formed by complexing an enantiopure chiral tag to the molecule of interest. Confidence in the analysis rests on how well theory and experimental spectral parameters match (there is also additional information about the relative differences in the rotational constants of the two diastereomeric complexes that is expected to be more reliable than simply absolute predictions of the constants). The spectral constants (e.g., rotational constants related to the principal moments-of-inertia that determine the transition frequencies and relative magnitudes of the projection of the dipole moment on the three principal axes which governs intensities) are somewhat global quantities.

A sample introduction system provide a racemic, isotopically labeled sample of the chiral tag. The rotational spectra of diastereomeric complexes can be re-measured using this isotopically-labeled tag (as compared to using a racemic tag lacking such labeling). When the obtained spectra from the racemic and isotopically-labeled chirally-tagged complexes are compared, small shifts in the transition frequencies can be detected Such shifts are generally caused by a change in the moments-of-inertia coming from the mass difference of the labeled nucleus (e.g., $^{13}C$ substituting at a single carbon atom ($^{12}C$) of the tag molecule). From the measured changes in the rotational constants, information about the position of the substitute atom in the two diastereomeric structures can be obtained. This information can represent a magnitude of the coordinates of the atom in a principal axis system. A distance from the center-of-mass to the substituted atom can be directly obtained from this information. Work in the field of molecular rotational spectroscopy indicates that these distances can be measured to better than 0.01 Angstrom accuracy. Generally, theoretical and experimental structures, even for molecular complexes, tend to show atom position agreement on the order of 0.1 Angstrom or better Therefore, this aspect of the present disclosure (e.g., using isotopically-labeled chiral tags) can provide exacting tests of the proposed theoretical structures of the molecule-chiral tag complex (both diastereomers) and can provide increased confidence in the assignment of the structure of the complex and, therefore, the absolute configuration of the molecule being analyzed.

An isotope-enriched, racemic tag sample can be delivered through the same sample introduction port as the non-labeled racemic tag. However, isotope-labeled impurity in the sample lines can produce a large number of weak transitions in the measurements that can complicate the search and assignment for the spectra of chiral tag complexes. Accordingly, for high accuracy analytical chemistry work, a separate sample introduction system might be used as mentioned above.

Generally, regarding the use of chiral tags in the present disclosure, one strength of the techniques described herein is that they can be applied generally to any molecule since non-covalent interactions generally produce a stable molecular complex. In addition, there is flexibility in the choice of tags so that the experiment can be controlled by choosing tags with structural features (e.g. hydrogen bond donor or acceptor groups) that are compatible with the analyte molecule being studied. It is also possible to specify tag molecules with atoms that have high natural abundance of more than one isotope (like chlorine and its $^{35}Cl/^{37}Cl$ isotopes) so that the additional information about atom positions in the tag that can verify the structure are directly available without the need for enriched samples. Generally, quantitative enantiomeric excess measurements use knowledge of the tag enantiopurity as an input. This information can be provided through other measurements like gas chromatography using a chiral column. However, it is also possible to determine the tag enantiopurity in the rotational spectrometer by measuring the relative abundance of the homochiral and heterochiral complexes that the tag makes with itself.

Figure 10:
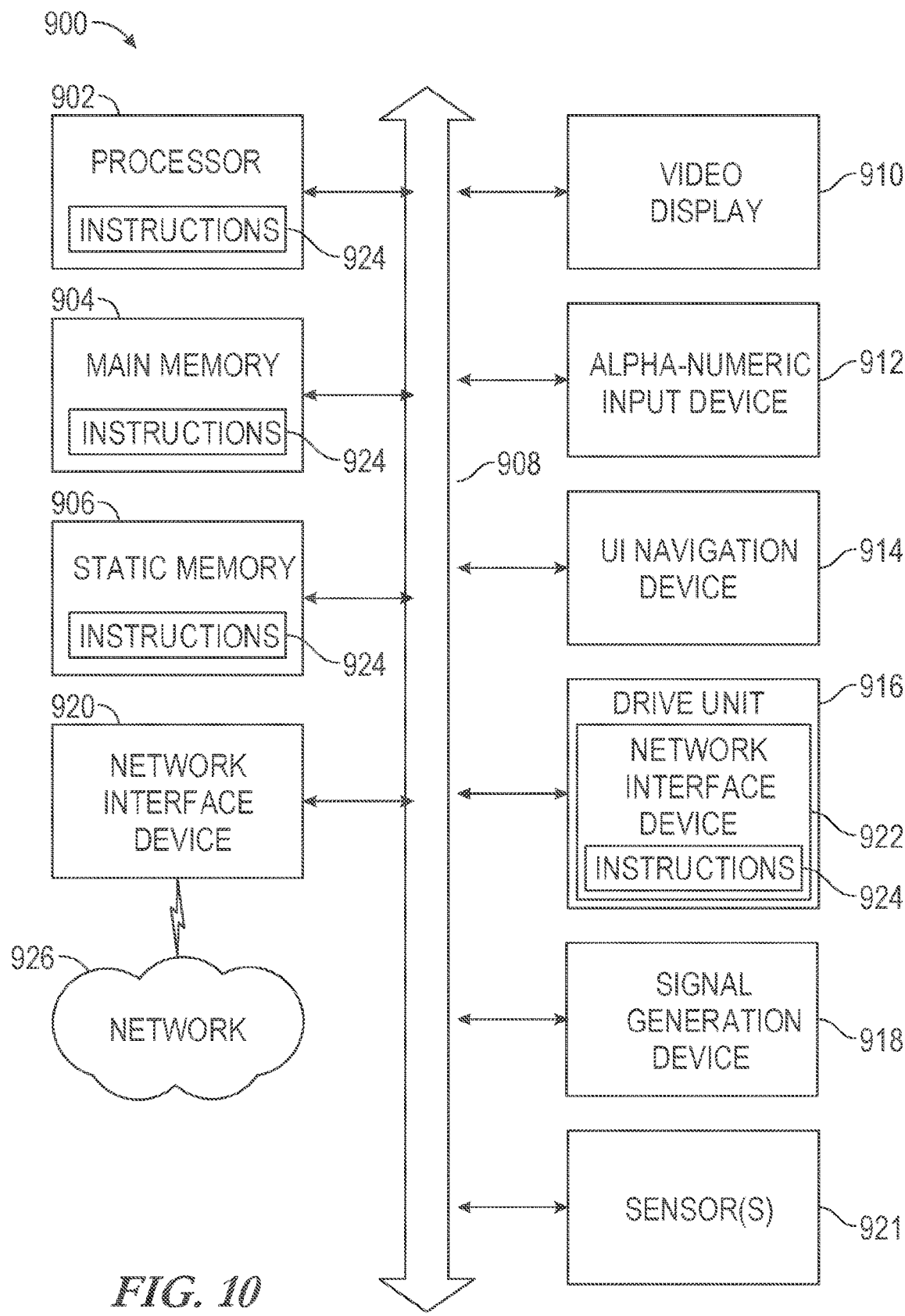
FIG. 10 illustrates generally a block diagram of an example that can include a machine upon which one or more embodiments (e.g., discussed methodologies described herein) can be implemented (e.g., run), such as where the machine is included as a portion of the system shown in FIG. 1 or where the system in FIG. 1 is communicatively coupled to the machine of FIG. 10.

FIG. 10 illustrates generally a block diagram of an example that can include a machine 900 upon which one or more embodiments (e.g., discussed methodologies described herein) can be implemented (e.g., run), such as where the machine is included as a portion of the apparatus 100 shown in FIG. 1 or where the system 100 in FIG. 1 is communicatively coupled to the machine 900 of FIG. 10. Examples of the machine 900 can include logic, one or more components, or circuits. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field-programmable gate array (FPGA) or an application-specific integrated circuit (ASIC). In an example, a circuit can include programmable logic (e.g., circuitry, as encompassed within a general-purpose processor or other programmable processor) that can be temporarily configured (e.g., by software) to perform the certain operations. It will be appreciated that apparatus and techniques described herein can be implemented in a circuit mechanically (e.g., in dedicated and permanently configured circuitry), or in temporarily configured circuitry (e.g., configured by software).

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits Where a multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which at least one of the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of techniques described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Generally, the techniques described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment, or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Examples of various embodiments (e.g., apparatus, systems, or methods) can be implemented in digital electronic circuitry, in computer hardware, in firmware, in software, or in any combination thereof. Examples of various embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Certain functionality can be implemented in permanently configured hardware (e.g., an ASIC), or in temporarily configured hardware (e.g., a combination of software and a programmable processor), for example.

In an example, the machine 900 can operate as a stand-alone device or the machine 900 can be connected (e.g., networked) to other machines. In a networked deployment, the machine 900 can operate in the capacity of either a server or a client machine in server-client network environments. In an example, the machine 900 can act as a peer machine in peer-to-peer (or other distributed) network environments. The machine 900 can be a personal computer (PC), a tablet PC, a set-top box (STB), a Personal Digital Assistant (PDA), a hand-held application-specific assembly, a mobile telephone, a web appliance, a network router, switch or bridge, or any machine capable of executing instructions (sequential or otherwise) specifying actions to be taken (e.g, performed) by the machine 900. Further, while only a single machine 900 is illustrated, the term "machine" shall also be taken to include any collection of machines that individually or jointly execute a set (or multiple sets) of instructions to perform any one or more of the methodologies discussed herein.

In an example, the machine (e.g., computer system) 900 can include a processor 902 (e.g., a central processing unit (CPU), a graphics processing unit (GPU) or both), a main memory 904 and a static memory 906, some or all of which can communicate with each other via a bus 908 or other link. The machine 900 can further include a display unit 910, an alphanumeric input device 912 (e.g., a keyboard), and a user interface (UI) navigation device 911 (e.g., a mouse, a touch-screen, or one or more soft-keys, as illustrative examples). In an example, the display unit 910, input device 912 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor.

The storage device 916 can include a machine readable medium 922 on which is stored one or more sets of data structures or instructions 924 (e.g. software) embodying or utilized by any one or more of the methodologies or functions described herein. The instructions 924 can also reside, completely or at least partially, within the main memory 904, within static memory 906, or within the processor 902 during execution thereof by the machine 900. In an example, one or any combination of the main memory 904, the static memory 906, or the storage device 916 can comprise a machine readable medium or machine readable media.

While the machine readable medium 922 is illustrated as a single medium, the term "machine readable medium" can include a single medium or multiple media (e.g., a centralized or distributed database, and/or associated caches and servers) that configured to store the one or more instructions 924. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone Service (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

VARIOUS NOTES

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of analyzing a chiral analyte having an unknown enantiomeric composition, comprising:
   providing a chiral tag having a specified enantiomeric composition;
   injecting the chiral analyte and the chiral tag into a sample cell, the chiral tag bonding to the chiral analyte to form a diastereomeric complex;
   determining a molecular rotational resonance (MRR) spectrum of the diastereomeric complex; and
   determining at least one of an absolute configuration of the chiral analyte or an enantiomeric excess of the chiral analyte based at least in part on the MRR spectrum of the diastereomeric complex.

2. The method of claim 1, wherein injecting the chiral analyte and the chiral tag into the sample cell comprises using a pulsed jet to provide expansion of the chiral analyte and the chiral tag into the sample cell, when the sample cell is at least partially evacuated.

3. The method of claim 1, wherein injecting the chiral analyte and the chiral tag into the sample cell comprises:
   entraining the chiral analyte in a first inert gas stream that flows into the sample cell via a first nozzle; and
   entraining the chiral tag in a second inert gas stream that flows into the sample cell via a second nozzle.

4. The method of claim 1, wherein the chiral tag comprises a racemic mixture.

5. The method of claim 1, wherein the chiral tag comprises an isotopically labeled composition.

6. The method of claim 1, wherein the chiral tag is enantioenriched.

7. The method of claim 1, wherein the chiral analyte and the chiral tag form the diastereomeric complex through a non-covalent interaction.

8. The method of claim 1, wherein determining the MRR spectrum of the diastereomeric complex comprises:
   exciting the diastereomeric complex with radiation falling within at least one of a microwave frequency range, a millimeter-wave range, or a terahertz frequency range; and
   detecting free induction decay of the diastereomeric complex in response to the radiation.

9. The method of claim 1, wherein determining the at least one of the absolute configuration of the chiral analyte or the enantiomeric excess of the chiral analyte comprises:
   determining the absolute configuration based on a comparison of a theoretically determined structure of the diastereomeric complex to the MRR spectrum.

10. The method of claim 1, wherein determining the at least one of the absolute configuration of the chiral analyte or the enantiomeric excess of the chiral analyte comprises:
    determining a structure of the diastereomeric complex based on the MRR spectrum; and
    determining the absolute configuration based on the structure of the diastereomeric complex.

11. The method of claim 1, wherein the chiral analyte and the chiral tag are injected into the sample cell via a first input port, the diastereomeric complex is a first diastereomeric complex, and the chiral tag is a first form of the chiral tag, and further comprising:
  injecting the chiral analyte and a second form of the chiral tag into the sample cell via a second input port, the second form of the chiral tag bonding to the chiral analyte to form a second diastereomeric complex; and
  determining a MRR spectrum of the second diastereomeric complex,
  wherein determining the at least one of the absolute configuration of the chiral analyte or the enantiomeric excess of the chiral analyte comprises determining the enantiomeric excess based on the MRR spectrum of the first diastereomeric complex and the MRR spectrum of the second diastereomeric complex.

12. The method of claim 11, wherein determining the enantiomeric excess comprises:
  isolating transitions associated with the first diastereomeric complex based on transitions in the MRR spectrum of the first diastereomeric complex that are absent from the MRR spectrum of the second diastereomeric complex.

13. An apparatus, comprising:
  a sample cell;
  a first input port, in fluid communication with the sample cell, to admit a first diastereomeric complex comprising a chiral analyte and a racemic mixture of a chiral tag into the sample cell for a first measurement;
  a second input port, in fluid communication with the sample cell, to admit a second diastereomeric complex comprising the chiral analyte and an enantiopure mixture of the chiral tag into the sample cell for a second measurement;
  a source, electrically coupled to the sample cell, to electrically excite contents of the sample cell with a pulse of radiation; and
  a receiver, electrically coupled to the sample cell, to detect a response from the contents of the sample cell to the pulse of radiation.

14. The apparatus of claim 13, wherein:
  the first input port is configured to entrain the chiral analyte and the racemic mixture in a first insert gas stream; and
  the second input port is configured to entrain the chiral analyte and the enantiopure mixture in a second insert gas stream.

15. The apparatus of claim 13, wherein the source is configurated to emit the pulse of radiation in at least one of a microwave frequency range, a millimeter-wave range, or a terahertz frequency range.

16. The apparatus of claim 13, further comprising:
  an isolator, coupled between the source and the sample cell, to attenuate or suppress signals propagating from the sample cell to the source.

17. A method of measuring enantiomeric excess of a chiral analyte of unknown enantiomeric composition, the method comprising:
  obtaining a molecular rotational resonance (MRR) spectrum of a first sample of the chiral analyte and a racemic mixture of a chiral tag;
  obtaining an MRR spectrum of a second sample of the chiral analyte and an enantiopure form of the chiral tag; and
  determining the enantiomeric excess of the chiral analyte based on the MRR spectrum of the first sample of the chiral analyte and the racemic mixture of the chiral tag and on the MRR spectrum of the second sample of the chiral analyte and the enantiopure form of the chiral tag.

18. The method of claim 17, wherein obtaining the MRR spectrum of the first sample of the chiral analyte and the racemic mixture of the chiral tag comprises:
  entraining the first sample of the chiral analyte in a first inert gas stream that flows through a first nozzle into a sample cell; and
  entraining the racemic mixture of the chiral tag in a second inert gas stream that flows into the sample cell via a second nozzle.

19. The method of claim 17, wherein obtaining the MRR spectrum of the first sample of the chiral analyte and the racemic mixture of the chiral tag comprises forming a first diastereomeric complex of first enantiomer of the chiral analyte and a first enantiomer of the chiral tag and forming a second diastereomeric complex of second enantiomer of the chiral analyte and a second enantiomer of the chiral tag.

20. The method of claim 17, wherein determining the enantiomeric excess of the chiral analyte comprises:
  isolating transitions associated with the first sample of the chiral analyte and the racemic mixture of the chiral tag based on transitions in the MRR spectrum of the first sample of the chiral analyte and the racemic mixture of the chiral tag that are absent from the MRR spectrum of the second sample of the chiral analyte and the enantiopure form of the chiral tag.

* * * * *